US012730884B2

(12) United States Patent
Whalen et al.

(10) Patent No.: US 12,730,884 B2
(45) Date of Patent: Sep. 8, 2026

(54) SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM

(71) Applicant: Expel, Inc., Herndon, VA (US)

(72) Inventors: Dan Whalen, Herndon, VA (US); Paul Diebold, Portland, OR (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/129,638

(22) Filed: Mar. 31, 2023

(65) Prior Publication Data

US 2023/0325498 A1 Oct. 12, 2023

Related U.S. Application Data

(60) Provisional application No. 63/351,784, filed on Jun. 13, 2022, provisional application No. 63/328,890, filed on Apr. 8, 2022.

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 2221/034* (2013.01)

(58) Field of Classification Search
CPC . G06F 21/554; G06F 21/566; G06F 2221/034
See application file for complete search history.

(56) References Cited

U.S. PATENT DOCUMENTS 10,904,280 B1 * 1/2021 Shivamoggi ........ H04L 63/1408
11,720,676 B2 * 8/2023 Smith .................... G06F 21/56 726/1

(Continued)

*Primary Examiner* — Jeffrey D. Popham
(74) *Attorney, Agent, or Firm* — Padowithz Alce; Chandler Scheitlin; Alce PLLC

(57) ABSTRACT

A system and method for accelerating a configuration and deployment of automated alert suppression instructions using a cybersecurity alert detection and response platform includes constructing a computer-executable alert suppression instruction based on a subset of a plurality of distinct pieces of alert data corresponding to a target cybersecurity alert; performing one or more alert suppression simulations based on the computer-executable alert suppression instruction, wherein each of the one or more alert suppression simulations include: automatically assessing a corpus of historical cybersecurity alert data of a predetermined time span against the computer-executable alert suppression instruction; and automatically computing a plurality of distinct cybersecurity threat-informative simulation metrics based on the automatic assessing; and implementing the computer-executable alert suppression instruction into a target subscriber-specific cybersecurity environment of the cybersecurity alert detection and response platform based on the plurality of distinct cybersecurity threat-informative simulation metrics satisfying one or more cybersecurity threat-informative efficacy thresholds.

21 Claims, 15 Drawing Sheets

200

Identifying Alert Suppression Candidates S210

Instantiating an Alert Suppression Configuration User Interface S220

Configuring Provisory Alert Suppression Parameters S230

Performing Inteligent Alert Suppression Simulations S240

Deploying Provisory Alert Suppression Parameters S250

After implementing a computer-executable event suppression instruction into one or more subscriber-specific cybersecurity environments:

Computing, via a machine learning model, a machine learning-based inference that includes a probability of the computer-executable event suppression instruction being stale Automatically terminating the computer-executable event suppression instruction implemented within the one or more subscriber-specific cybersecurity environments based on the probability satisfying an automated suppression discontinuation threshold

(56) References Cited

U.S. PATENT DOCUMENTS

2010/0083375 A1* 4/2010 Friedman ............ H04L 63/1433
726/22
2015/0213268 A1* 7/2015 Nance .................. G06F 21/577
726/1
2017/0099309 A1* 4/2017 Di Pietro ............ H04L 63/1425
2017/0286671 A1* 10/2017 Chari .................... G06F 21/552
2019/0319972 A1* 10/2019 Desai .................. H04L 63/1425
2020/0021605 A1* 1/2020 Cardinal ............... H04L 63/145
2020/0053127 A1* 2/2020 Brotherton ............. H04L 67/53

* cited by examiner

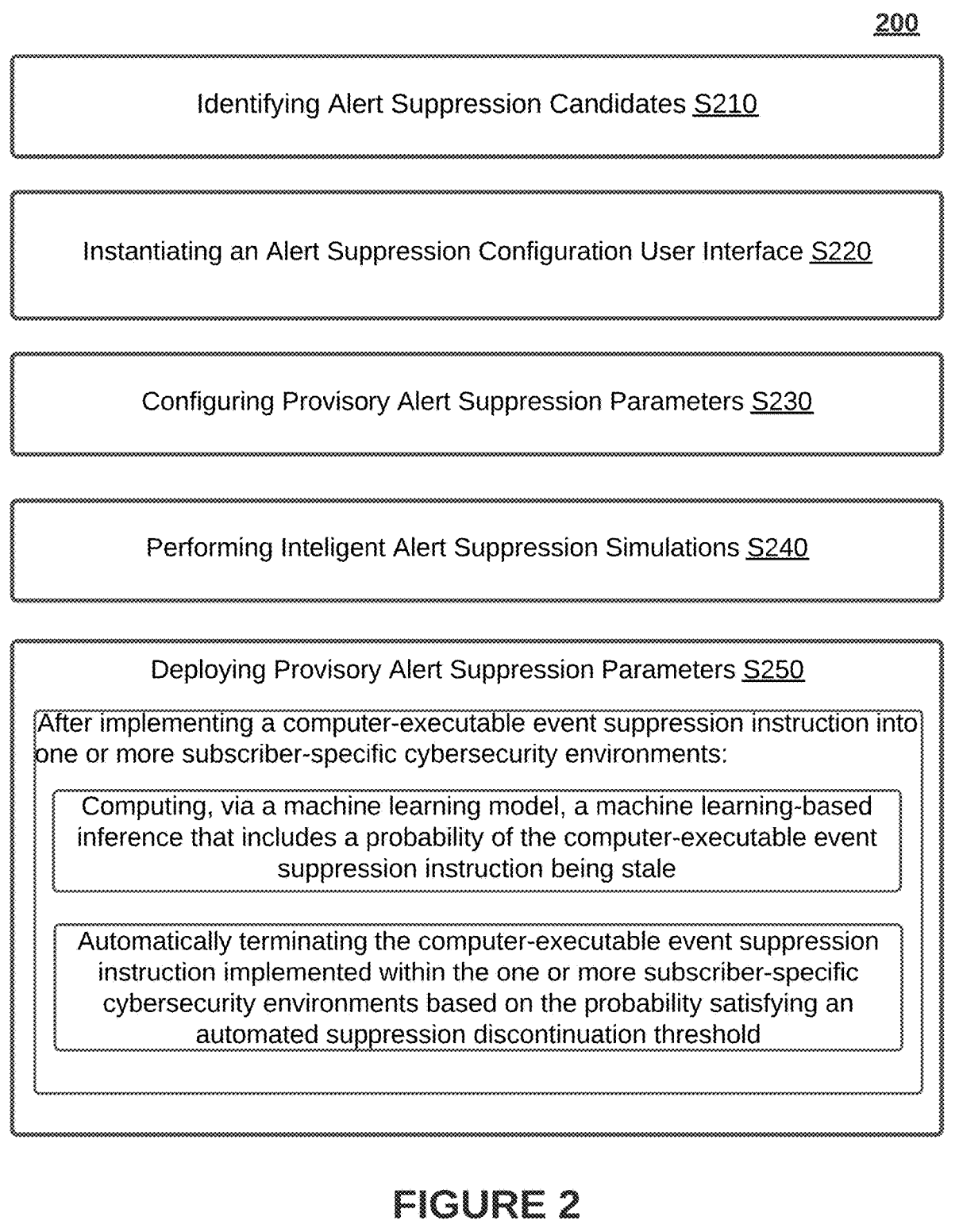

200

Identifying Alert Suppression Candidates S210

Instantiating an Alert Suppression Configuration User Interface S220

Configuring Provisory Alert Suppression Parameters S230

Performing Inteligent Alert Suppression Simulations S240

Deploying Provisory Alert Suppression Parameters S250

After implementing a computer-executable event suppression instruction into one or more subscriber-specific cybersecurity environments:

Computing, via a machine learning model, a machine learning-based inference that includes a probability of the computer-executable event suppression instruction being stale Automatically terminating the computer-executable event suppression instruction implemented within the one or more subscriber-specific cybersecurity environments based on the probability satisfying an automated suppression discontinuation threshold

FIGURE 2

Dashboard | Alerts | 7 | 99+ | 27 | 19 | All Organizations

Alerts | 7 Critical | 441 High | 249 Medium | 27 Low | 13 Tuning

Newest First | New | All Alert Type | All Assignments

Alert 1

Alert 2

Alert 3

Alert 4

Alert 5

Alert N

Assigned to: Expel Evidence Summary | ! | Close | Add to | Investigate

We have seen 207 similar benign alerts in the last year. Consider writing a suppression >>

| Closed Alerts | Alerts in Investigations | Alerts in Incidents | Alerts in Critical Incidents |
|---|---|---|---|
| 7 (64%) | 0 (0%) | 4 (36%) | 0 (0%) |

ABC-12345 is the most recent incident (12/2). There have been 6 in the last 30 days.
ABC-12345 is the most recent incident (11/30). There have been 4 in the last 30 days.

(13) Suspicious PowerShell use

Changed severity from medium to high due to likelihood of malicious arguments.

Kibana | Tune | Customer Context | GUIDs | Prosecutor | Pivot to...

Expel Alert Time 2020-12-03T16:36:07Z (6hr ago)
Vendor Alert Time 2020-12-03T16:36:07Z (6hr ago)
Vendor Defender ATP
Vendor alert name [Discovery] Suspicious sequence of exploration activities
Message Detection Source: WindowsDefenderAtp

Asset details

Hostname Computer Name
OS Windows 10
Serial number 0a1b2c3d4e5f6g7h8i9j1k01112131415161718 1920

User Evidence

Username user.person@email.com
domain Computer Name
sid S-1-5-21-1180699209-877415012-3182924384-1004

Process tree Main process

V powerpnt.exe PID-13928

^ powershell.exe PID-13012
Process name powershell.exe
Process command C:\Windows\System32\WindowsPowerShell\v1.0 powershell.exe –nop –w hidden –noni –c "if ([IntPtr]::Size-eq 4)($b='powershell.exe')else {$b=$env:windir+'\syswow...
Started at 2020-11-23T18:10:50Z
File path C:\Windows\System32\WindowsPowerShell\v1.0
Digital signature issuer Microsoft Windows Production PCA 2011
Signed True
Sig SHA1 Ae9c1ae54763822eec42474983d8b635116c8452
Sig signer Microsoft Windows
Sig program name Microsoft®Windows ® Operating System
Sig publisher Microsoft Corporation

SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM

CROSS-REFERENCE TO RELATED APPLICATIONS

This application claims the benefit of U.S. Provisional Application No. 63/351,784, filed 13 Jun. 2022 and U.S. Provisional Application No. 63/328,890, filed 8 Apr. 2022, which are incorporated in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE INVENTION(S)

In one embodiment, a computer-implemented method for accelerating a configuration and deployment of automated event suppression instructions includes at a cybersecurity event detection and response service: identifying, via one or more processors, an event suppression candidate based on identifying a cybersecurity event that satisfies automated event suppression criteria of the cybersecurity event detection and response service; constructing, via the one or more processors, a computer-executable event suppression instruction based on event data or event features of the cybersecurity event; performing, via the one or more processors, one or more event suppression simulations based on the computer-executable event suppression instruction, wherein each of the one or more event suppression simulations include: (a) automatically assessing one or more corpora of historical cybersecurity event data of a predetermined time span against the computer-executable event suppression instruction; and (b) automatically computing a plurality of distinct cybersecurity threat-informative simulation metrics based on the automatic assessing of the one or more corpora of historical cybersecurity event data against the computer-executable event suppression instruction; and implementing, via the one or more processors, the computer-executable event suppression instruction into one or more subscriber-specific cybersecurity environments of the cybersecurity event detection and response service based on at least a subset of the plurality of distinct cybersecurity threat-informative simulation metrics satisfying one or more cybersecurity threat-informative efficacy thresholds.

In one embodiment, the computer-implemented method includes wherein identifying the cybersecurity event includes: automatically assessing, via the one or more processors, a plurality of distinct clusters of cybersecurity event data; and automatically identifying, via the one or more processors, a target cluster of cybersecurity event data of the plurality of distinct clusters of cybersecurity event data that satisfies the automated event suppression criteria of the cybersecurity event detection and response service based on the assessing, wherein the target cluster of cybersecurity event data includes the cybersecurity event.

In one embodiment, the computer-implemented method includes wherein the target cluster of cybersecurity event data satisfies the automated event suppression criteria of the cybersecurity event detection and response service based on: identifying, via the one or more processors, that each distinct cybersecurity event included in the target cluster of cybersecurity event data corresponds to a non-malicious cybersecurity event; identifying, via the one or more processors, that a total quantity of cybersecurity events included in the target cluster of cybersecurity event data satisfies a service-defined cluster size threshold; and identifying, via the one or more processors, that a plurality of distinct pieces of event metadata corresponds to each distinct cybersecurity event of the target cluster of cybersecurity event data.

In one embodiment, the computer-implemented method includes wherein constructing the computer-executable event suppression instruction includes: automatically constructing, via the one or more processors, the computer-executable event suppression instruction based on the identifying of the plurality of distinct pieces of event metadata that corresponds to each distinct cybersecurity event of the target cluster of cybersecurity event data, wherein each distinct piece of event metadata of the plurality of distinct pieces of event metadata defines a distinct alert suppression parameter of the computer-executable event suppression instruction.

In one embodiment, the computer-implemented method further includes wherein automatically evaluating, via the one or more processors, the cybersecurity event against the one or more corpora of historical cybersecurity event data; detecting, via the one or more processors, that the cybersecurity event corresponds to a plurality of historical, non-malicious cybersecurity events based on the evaluating, wherein a numerical quantity of the plurality of historical, non-malicious cybersecurity events satisfies an event suppression quantity threshold; and wherein the identifying the cybersecurity event is further based on the detecting.

In one embodiment, the computer-implemented method further includes generating, via a machine learning-based clustering algorithm, a plurality of distinct cybersecurity event clusters based on the one or more corpora of historical cybersecurity event data, wherein each distinct cybersecurity event cluster of the plurality of distinct cybersecurity event clusters includes a plurality of distinct cybersecurity event representations that correspond to a plurality of distinct cybersecurity events; identifying, via the one or more processors, that a vector representation of the cybersecurity event is within a threshold distance of a non-malicious cybersecurity event cluster of the plurality of distinct cybersecurity event clusters; wherein the non-malicious cybersecurity event cluster satisfies the automated event suppression criteria of the cybersecurity event detection and response service; and wherein the identifying the event suppression candidate is further based on the identifying of the non-malicious cybersecurity event cluster.

In one embodiment, the computer-implemented method includes wherein automatically computing the plurality of distinct cybersecurity threat-informative simulation metrics include: computing, via the one or more processors, a numerical quantity of malicious cybersecurity events that the computer-executable event suppression instruction, if retroactively implemented, would have automatically suppressed or automatically disposed.

In one embodiment, the computer-implemented method includes wherein automatically computing the plurality of distinct cybersecurity threat-informative simulation metrics include: computing, via the one or more processors, a numerical quantity of cybersecurity investigations that the cybersecurity event detection and response service would have inadvertently bypassed based on identifying a subset of investigation-required cybersecurity events of the one or more corpora of historical cybersecurity event data that the computer-executable event suppression instruction, if retroactively implemented, would have automatically suppressed or automatically disposed.

In one embodiment, the computer-implemented method includes wherein implementing the computer-executable event suppression instruction into the one or more subscriber-specific cybersecurity environments of the cybersecurity event detection and response service includes: implementing the computer-executable event suppression instruction into a target subscriber-specific cybersecurity environment that corresponds to a subscriber of the cybersecurity event.

In one embodiment, the computer-implemented method includes wherein implementing the computer-executable event suppression instruction into one or more subscriber-specific cybersecurity environments of the cybersecurity event detection and response service includes implementing the computer-executable event suppression instruction into a plurality of distinct subscriber-specific cybersecurity environments that corresponds to a plurality of distinct subscribers.

In one embodiment, a computer-implemented method includes automatically assessing, via one or more processors, a plurality of distinct clusters of cybersecurity alerts based on automated alert suppression construction criteria of a cybersecurity event detection and response service; automatically identifying, via the one or more processors, a target cluster of cybersecurity alerts of the plurality of distinct clusters of cybersecurity alerts that satisfies the automated alert suppression construction criteria based on the automatic assessing; automatically extracting, from the target cluster of cybersecurity alerts, a plurality of distinct pieces of alert metadata that corresponds to each distinct cybersecurity alert or each distinct cybersecurity alert representation included in the target cluster of cybersecurity alerts based on the identifying of the target cluster of cybersecurity alerts; automatically constructing, via the one or more processors, a computer-executable alert suppression instruction based on the plurality of distinct pieces of alert metadata; and automatically suppressing, via the one or more processors, an inbound cybersecurity alert associated with one or more computing or digital assets of a target subscriber based on one or more pieces of alert data of the inbound cybersecurity alert satisfying automated alert suppression criteria of the computer-executable alert suppression instruction.

In one embodiment, the computer-implemented method includes obtaining, via the one or more processors, a corpus of cybersecurity alert data samples, wherein the corpus of cybersecurity alert data samples includes a plurality of distinct cybersecurity alerts; constructing, via the one or more processors, a corpus of cybersecurity alert vector representations based on the corpus of cybersecurity alert data samples, wherein generating the corpus of cybersecurity alert vector representations includes: implementing a cybersecurity alert vectorization algorithm that converts each of the plurality of distinct cybersecurity alerts to a distinct numerical vector representation; and generating, via a machine learning-based clustering algorithm, the plurality of distinct clusters of cybersecurity alerts based on the corpus of cybersecurity event vector representations.

In one embodiment, a method for accelerating a configuration and deployment of automated alert suppression instructions using a cybersecurity alert detection and response platform includes constructing, via one or more processors, a computer-executable alert suppression instruction based on a subset of a plurality of distinct pieces of alert data corresponding to a target cybersecurity alert; performing, via the one or more processors, one or more alert suppression simulations based on the computer-executable alert suppression instruction, wherein each of the one or more alert suppression simulations include: automatically assessing a corpus of historical cybersecurity alert data of a predetermined time span against the computer-executable alert suppression instruction; and automatically computing a plurality of distinct cybersecurity threat-informative simulation metrics based on the automatic assessing of the corpus of historical cybersecurity alert data against the computer-executable alert suppression instruction; and implementing, via the one or more processors, the computer-executable alert suppression instruction into a subscriber-specific cybersecurity environment of the cybersecurity alert detection and response platform that corresponds to a subscriber associated with the target cybersecurity alert based on the plurality of distinct cybersecurity threat-informative simulation metrics satisfying one or more cybersecurity threat-informative efficacy thresholds.

In one embodiment, the method further includes automatically identifying the target cybersecurity alert as an alert suppression candidate based on the target cybersecurity alert satisfying automated alert suppression criteria of the cybersecurity alert detection and response platform; displaying, via a web-accessible user interface, a representation of the target cybersecurity alert, wherein the representation of the target cybersecurity alert includes: the plurality of distinct pieces of alert data of the target cybersecurity alert; and an alert suppression user interface element integrally displayed within the representation of the target cybersecurity alert, wherein the representation of the target cybersecurity alert includes the alert suppression user interface element based on the identifying of the target cybersecurity alert as the alert suppression candidate, and wherein the alert suppression user interface element comprises one or more emphasized regions that visually emphasizes the alert suppression user interface element from portions external to the alert suppression user interface element.

In one embodiment, the method includes wherein: the alert suppression user interface element includes: a textual summary comprising a numerical quantity of a total number of historical cybersecurity alerts that is substantially similar to the target cybersecurity alert, wherein each cybersecurity alert of the historical cybersecurity alerts was previously identified as non-malicious by the cybersecurity alert detection and response platform; and a selectable hyperlink that, when selected, instantiates an alert suppression configuration user interface.

In one embodiment, the method includes wherein the alert suppression configuration user interface includes a plurality of distinct regions including: an alert suppression configuration region that enables a target user a capability of configuring one or more alert suppression parameters of the computer-executable alert suppression instruction based on receiving one or more inputs from the target user at the alert suppression configuration region; an alert suppression simulation region that enables the target user a capability of executing the one or more alert suppression simulations based on receiving one or more inputs from the target user at the alert suppression simulation region, and an alert suppression deployment region that enables the target user a capability of implementing the computer-executable alert suppression instruction into the subscriber-specific cybersecurity environment based on receiving one or more inputs from the target user at the alert suppression deployment region.

In one embodiment, the method includes wherein the alert suppression configuration user interface includes a plurality of distinct regions including: an alert suppression configuration region that operably communicates with an alert suppression configuration module that enables a target user a capability of configuring one or more alert suppression parameters of the computer-executable alert suppression instruction based on receiving one or more inputs from the target user at the alert suppression configuration region; an alert suppression simulation region that operably communicates with an alert suppression simulation module that enables the target user a capability of executing the one or more alert suppression simulations based on receiving one or more inputs from the target user at the alert suppression simulation region, and an alert suppression deployment region that operably communicates with an alert suppression deployment module that enables the target user a capability of implementing the computer-executable alert suppression instruction into the subscriber-specific cybersecurity environment based on receiving one or more inputs from the target user at the alert suppression deployment region.

In one embodiment, the method further includes automatically tagging the target cybersecurity alert as an alert suppression candidate based on the target cybersecurity alert satisfying alert suppression criteria of the cybersecurity alert detection and response platform, wherein the target cybersecurity alert satisfies the alert suppression criteria of the cybersecurity alert detection and response platform based on: automatically identifying, via the one or more processors, that a plurality of historical, non-malicious cybersecurity alerts is substantially similar or substantially equivalent to the target cybersecurity alert; and automatically identifying, via the one or more processors, that a numerical quantity of a total number of the plurality of historical, non-malicious cybersecurity alerts satisfies a platform-defined alert quantity threshold.

In one embodiment, the method further includes wherein automatically computing the plurality of distinct cybersecurity threat-informative simulation metrics include: computing, via the one or more processors, a numerical quantity of malicious cybersecurity events that the computer-executable alert suppression instruction, if retroactively implemented, would have automatically suppressed.

In one embodiment, the method further includes tuning one or more alert suppression parameters of the computer-executable alert suppression instruction based on the numerical quantity of malicious cybersecurity events exceeding a platform-defined malicious alert threshold value.

BRIEF DESCRIPTION OF THE FIGURES

FIG. 2 illustrates an example method 200 in accordance with one or more embodiments of the present application;

FIG. 5 illustrates an example representation of an alert suppression candidate in accordance with one or more embodiments of the present application;

FIGS. 6A and 6B illustrates an example representation of instantiating an alert suppression configuration user interface in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
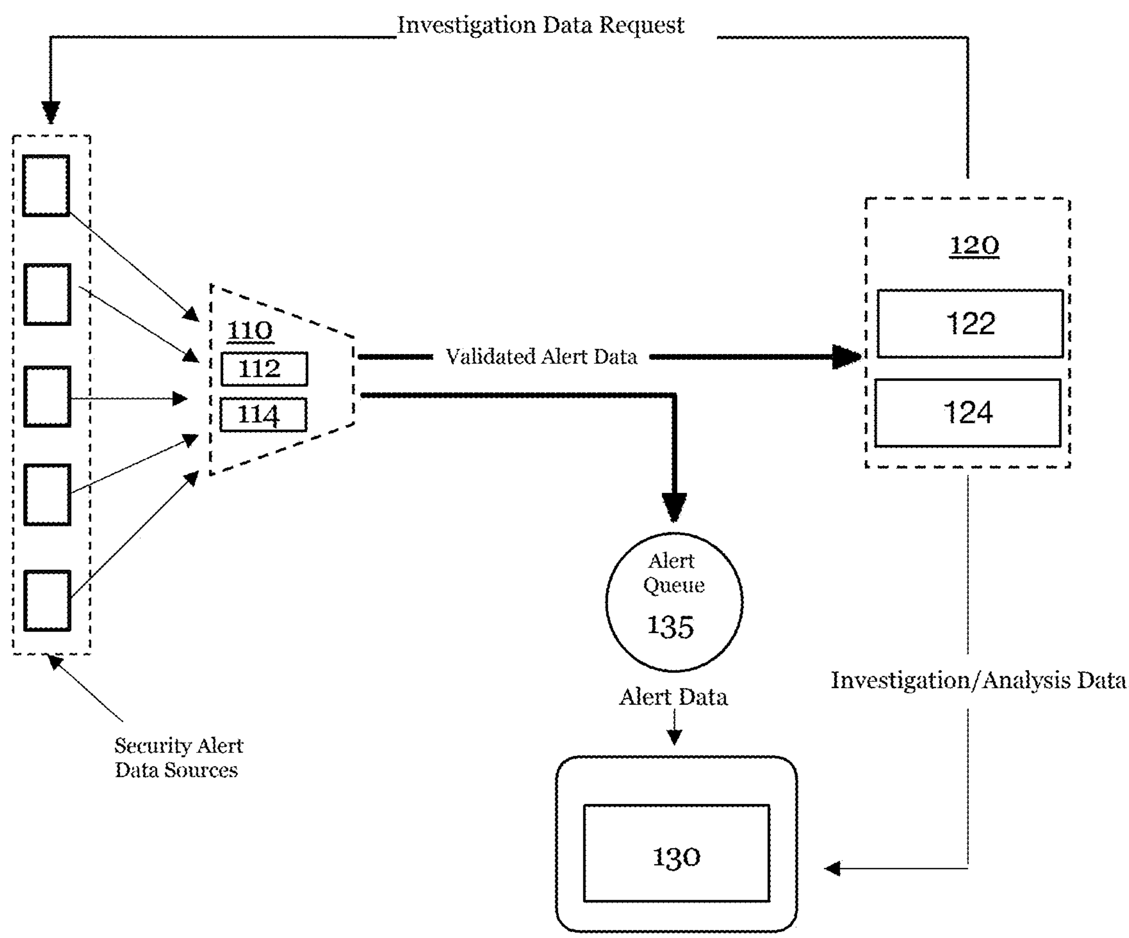
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100, a cybersecurity service 100, a cybersecurity event detection and response service 100, and/or a cybersecurity alert detection and response platform 100.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module no may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format.

1.1.1 Security Alert Machine Learning System

Optionally, or additionally, the security alert engine no may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional and/or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Intelligent Configuration and Deployment of Alert Suppression Parameters As shown in FIG. 2, a method 200 for intelligent configuration and deployment of alert suppression parameters may include identifying alert suppression candidates S210, instantiating an alert suppression configuration user interface S220, configuring provisory alert suppression parameters S230, performing intelligent alert suppression simulations S240, and deploying the provisory alert suppression parameters S250.

2.10 Identifying Alert Suppression Candidates

S210, which includes identifying alert suppression candidates, may function to identify alert suppression candidates based on detecting that one or more cybersecurity alerts, one or more cybersecurity events, and/or one or more clusters of cybersecurity event data satisfies alert suppression criteria. In a preferred embodiment, S210 may function to (e.g., automatically) identify a target cybersecurity alert, a target cybersecurity event, and/or a target cluster of cybersecurity event data as an alert suppression candidate if the target cybersecurity alert, the target cybersecurity event, and/or the target cluster of cybersecurity event data shares one or more alert/event attributes (e.g., one or more equivalent alert/event attributes values) with a plurality of distinct cybersecurity alerts and/or a plurality of distinct cybersecurity events previously identified as benign (e.g., non-malicious) by a system or service implementing the method 200 (e.g., the system or service 100). For ease of description in the remainder of this disclosure, a target cybersecurity event and/or a target cybersecurity alert may be referred to as an "alert suppression candidate" irrespective of whether the alert suppression candidate was identified based on alert data, event data, or a combination of both alert and event data.

Figure 3:
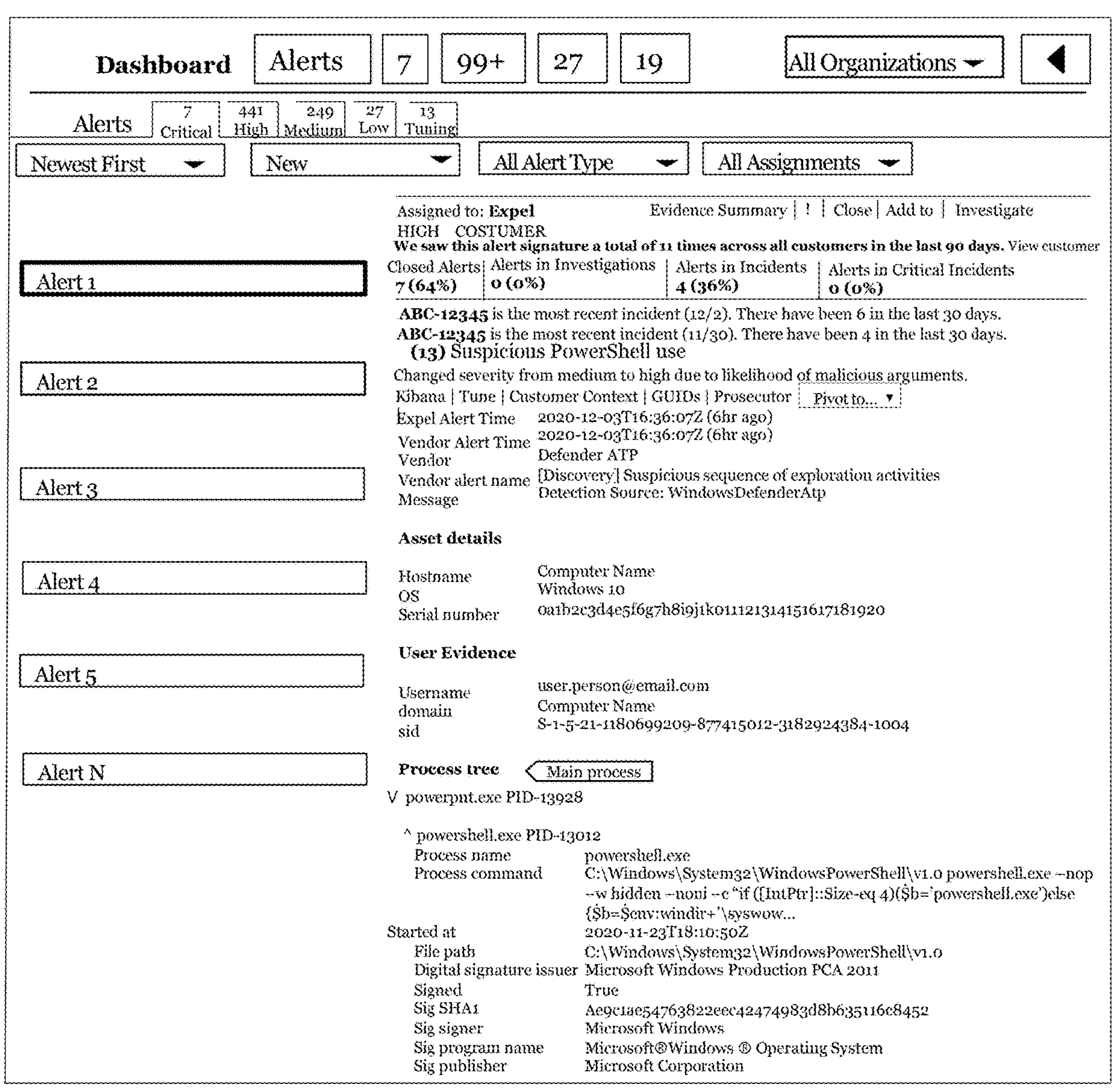
FIG. 3 illustrates an example representation of an internet-accessible alert user interface in accordance with one or more embodiments of the present application.
Figure 4:
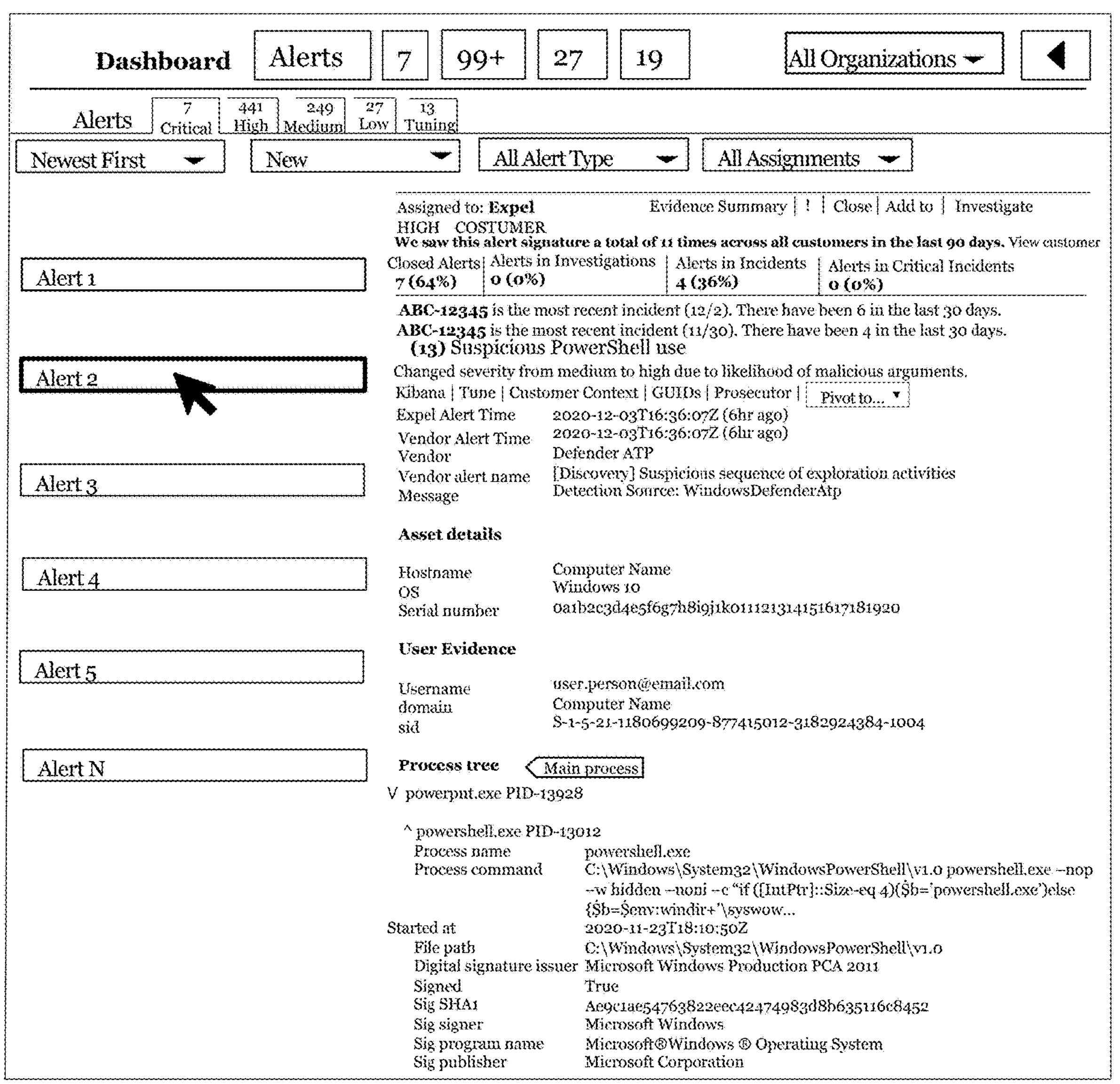
FIG. 4 illustrates an example representation of an alert suppression candidate in accordance with one or more embodiments of the present application.

In one or more embodiments, S210 may function to implement a security alert engine (e.g., the security alert engine 110) that may ingest alert data and/or event data involving digital/computing assets of subscribing entities, process a combination of the alert data and/or event data, and publish one or more likely cybersecurity threats or validated security alerts based on the processing as described in U.S. patent application Ser. No. 17/488,800, filed on 29 Sep. 2021, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated herein in its entirety by this reference. The one or more likely cybersecurity threats or validated security alerts may be electronically transmitted to a security alert queue and a representation of the security alert queue may be displayed via a web-based alert user interface, as shown generally by way of example in FIG. 3 and FIG. 4.

Automated Identification of Alert Suppression Candidates

In one or more embodiments, S210 may function to automatically identify or detect, via one or more computers, that one or more cybersecurity alerts (e.g., one or more cybersecurity events, etc.) of the security alert queue may be alert suppression candidates, as described in more detail herein.

(i) Automated Identification of Alert Suppression Candidates Via Service-Defined Criteria In a first implementation, S210 may function to automatically identify a subset of cybersecurity alerts of the security alert queue as alert suppression candidates based on each cybersecurity alert of the subset satisfying service-defined alert suppression criteria. In some embodiments, alert suppression criteria (e.g., alert suppression construction criteria or the like) may be satisfied when S210 identifies that a cybersecurity alert (of the security alert queue) may be substantially similar to a plurality of historical cybersecurity alerts previously identified as a non-security threat (e.g., benign, non-malicious) by the system or service 100. Additionally, or alternatively, alert suppression criteria may be satisfied when S210 determines that a quantity of a total number of the plurality of historical cybersecurity alerts satisfies a service-defined alert count threshold (e.g., a minimum number of instances of a benign or non-malicious alert).

A service-defined alert count threshold, as referred to herein, preferably relates to an observance of a set minimum number of instances of a benign alert type that supports a creation of alert suppression parameters and/or alert suppression instructions for the benign alert type.

In one or more embodiments, to identify substantially similar cybersecurity alerts to a target cybersecurity alert, S210 may function to construct an alert search query that, when executed, may function to query a historical events/alerts database (or an n-dimensional vector space) and return a quantity of historical alerts substantially similar to the target cybersecurity alert previously determined to be of a non-security threat (e.g., benign) and/or a quantity of historical alerts similar to the subject cybersecurity alert previously determined to be a security threat (e.g., prompted a cybersecurity investigation or a cybersecurity incident), if any. It shall be noted that the alert search query constructed for a target cybersecurity alert may include, as search parameters, one or more pieces of alert metadata of the target cybersecurity alert.

Accordingly, S210 may function to identify the target cybersecurity alert as an alert suppression candidate if the quantity of historical alerts determined to be of a non-security threat satisfies the service-defined alert count threshold. Conversely, if the results of the alert search query returned one or more historical alerts determined to pose a likely or probable cybersecurity threat, S210 may function to forgo identifying the subject cybersecurity alert as an alert suppression candidate.

(ii) Machine Learning-Based Identification of Alert Suppression Candidates

In a second implementation, S210 may function to automatically identify alert suppression candidates using one or more machine learning-based classification models. In one or more embodiments of the second implementation, S210 may function to implement a machine learning-based classification model that may be trained to produce or compute an alert suppression inference that includes a likelihood or a probability identifying whether a target cybersecurity alert should be suppressed. Accordingly, S210 may function to extract a corpus of features associated with a target cybersecurity alert and provide the corpus of features as input to the machine learning-based classification model that predicts and/or computes an alert suppression classification inference for the target cybersecurity alert.

In one or more embodiments, S210 may function to classify or label the target cybersecurity alert as an alert suppression candidate based on the machine learning-based classification model computing a classification label indicating that the target cybersecurity alert is a (valid) alert suppression candidate. Conversely, S210 may function to classify or label the target cybersecurity alert as a non-alert suppression candidate based on the machine learning-based classification model computing a classification label indicating that the target cybersecurity alert is an (invalid) alert suppression candidate.

Additionally, or alternatively, S210 may function to identify one or more alert suppression candidates based on machine learning-based clustering of a corpus of alerts. In such embodiments, S210 may function to provide the corpus of alerts, as input, to a machine learning-based clustering algorithm that predicts one or more clusters of alerts. Accordingly, S210 may function to evaluate each of the one or more clusters to identify whether a target cybersecurity alert may be found within a cluster of benign (e.g., non-malicious) alerts. Stated another way, in one or more embodiments, S210 may function identify that a target cybersecurity alert is an alert suppression candidate based on a vector representation of the target cybersecurity alert being within a threshold distance of a non-malicious cybersecurity alert cluster of the one or more clusters of alerts in which the non-malicious cybersecurity event cluster satisfies automated alert suppression criteria (e.g., alert suppression construction criteria or the like), as described herein.

Additionally, or alternatively, in one or more embodiments, S210 may function to identify, via one or more processors, an alert suppression candidate based on identifying a cybersecurity alert or a group of cybersecurity alerts (e.g., a cluster of cybersecurity alerts, etc.) that satisfies automated alert suppression criteria of the cybersecurity event detection and response service. In a non-limiting example, S210 may function to identify or tag, via one or more processors, a target cybersecurity alert as an alert suppression candidate based on automatically assessing, via one or more processors, a plurality of distinct clusters of cybersecurity alert data and/or automatically identifying, via the one or more processors, a target cluster of cybersecurity alert data that satisfies the automated alert suppression criteria based on the assessing. It shall be noted that, in one or more embodiments, the target cluster of cybersecurity alert data may include the target cybersecurity alert. It shall be further noted that, in one or more embodiments, the target cluster of cybersecurity alert data may satisfy the automated alert suppression criteria based on identifying (e.g., confirming, etc.), via one or more processors, that each distinct cybersecurity alert included in the target cluster of cybersecurity alert data corresponds to a non-malicious cybersecurity alert, identifying (e.g., confirming, etc.), via one or more processors, that a total quantity of cybersecurity alerts included in the target cluster of cybersecurity alert data satisfies a service-defined cluster size threshold (e.g., the service-defined cluster size threshold may be satisfied when the total quantity of cybersecurity alerts included in the target cluster is greater than 10, greater than 50, greater than 100, or any suitable number), and/or identifying (e.g., confirming), via the one or more processors, that a plurality of distinct pieces of alert metadata corresponds to each distinct cybersecurity alert of the target cluster of cybersecurity alert data.

Additionally, or alternatively, in one or more embodiments, S210 may function to (e.g., automatically) identify, source, and/or obtain, via one or more processors, an alert suppression candidate. In such embodiments, S210 may function to automatically assess, via one or more processors, a plurality of distinct clusters of cybersecurity alerts based on automated alert suppression construction criteria or the like of the service or system 100 implementing the method 200. Accordingly, S210 may function to automatically identify, via one or more processors, a target cluster of cybersecurity alerts of the plurality of distinct clusters of cybersecurity alerts that satisfies the automated alert suppression construction criteria based on the automatic assessing.

It shall be noted that, in one or more embodiments, a target cluster of cybersecurity alerts may satisfy automated alert suppression construction criteria based on identifying (e.g., confirming, etc.), via one or more processors, that each distinct cybersecurity alert included in the target cluster of cybersecurity alerts corresponds to a non-malicious cybersecurity alert, identifying (e.g., confirming, etc.), via one or more processors, that a total quantity of cybersecurity alerts included in the target cluster of cybersecurity alerts satisfies a service-defined cluster size threshold (e.g., the service-defined cluster size threshold may be satisfied when the total quantity of cybersecurity alerts included in the target cluster is greater than 10, greater than 50, greater than 100, or any suitable number), and/or identifying (e.g., confirming), via the one or more processors, that a plurality of distinct pieces of alert metadata corresponds to each distinct cybersecurity alert of the target cluster of cybersecurity alert data.

It shall be further noted that, in one or more embodiments, the plurality of distinct clusters of cybersecurity alerts may be generated based on one or more of obtaining, via the one or more processors, a corpus of cybersecurity alert data samples in which the corpus of cybersecurity alert data samples may include a plurality of distinct cybersecurity alerts; constructing, via the one or more processors, a corpus of cybersecurity alert vector representations based on the corpus of cybersecurity alert data samples in which generating the corpus of cybersecurity alert vector representations includes implementing a cybersecurity alert vectorization algorithm that may convert each of the plurality of distinct cybersecurity alerts to a distinct numerical vector representation; and generating, via a machine learning-based clustering algorithm, the plurality of distinct clusters of cybersecurity alerts based on the corpus of cybersecurity event vector representations as described in U.S. patent application Ser. No. 17/850,328, filed on 27 Jun. 2022, titled SYSTEMS AND METHODS FOR INTELLIGENT CYBERSECURITY ALERT SIMILARITY DETECTION AND CYBERSECURITY ALERT HANDLING, which is incorporated herein in its entirety by this reference.

Surfacing Alert Suppression Candidates Via Alert Suppression User Interface Elements In one or more embodiments, in response to detecting (or identifying) a subject cybersecurity alert as an alert suppression candidate, S210 may function to generate an alert suppression user interface element, via a cybersecurity dashboard, that may surface or emphasize to an analyst or the like that the subject cybersecurity alert (or a target cluster of cybersecurity alerts) may be an alert suppression candidate and/or indicate (or recommend) to the analyst or the like to consider configuring an alert suppression (e.g., an alert suppression heuristic, alert suppression parameters, a computer-executable alert suppression instruction, or the like) based on the subject cybersecurity alert (or the target cluster of cybersecurity alerts) satisfying one or more alert suppression criteria. For instance, in a non-limiting example, based on identifying a target cybersecurity alert as an alert suppression candidate, S210 may function to generate, via one or more processors, an alert suppression user interface banner or the like that may be integrally displayed within a distinct cybersecurity alert windowpane associated with the target cybersecurity alert that (e.g., visually) emphasizes to an analyst or the like that the target cybersecurity alert is an alert suppression candidate, as shown generally by way of example in FIG. 5.

In one or more embodiments, to emphasize, expose, or bring attention (e.g., analyst focus) to the alert suppression user interface element, S210 may function to position the alert suppression user interface element proximal to an upper portion of the cybersecurity alert windowpane, display the alert suppression user interface element with a first color intensity and display the target cybersecurity alert windowpane with a second color intensity distinct from the first color intensity, and/or display the alert suppression user interface element with a first color and display the target cybersecurity alert windowpane with a second color distinct from the first color, or the like. It shall be recognized that S210 may function to surface or emphasize a potential alert suppression candidate via any suitable mechanism including, but not limited, via user interface notifications (e.g., sounds, alarms, etc.), messages, and/or the like.

(iii) Analyst-Identification of Alert Suppression Candidates

In a third implementation, S210 may function to identify one or more alert suppression candidates based on detecting one or more user inputs or a sequence of user inputs directed towards one or more cybersecurity alerts (or one or more representation of cybersecurity alerts) displayed on the alert user interface. In operation, while displaying the alert user interface, a security analyst or the like may function to assess a plurality of distinct cybersecurity alerts displayed thereon and identify one or more of the plurality of distinct cybersecurity alerts as alert suppression candidates based on the assessment.

Accordingly, in one or more embodiments, S210 may function to recognize a subject cybersecurity alert as an alert suppression candidate in response to identifying (or receiving) an input from the security analyst or the like, selecting the subject cybersecurity alert or a representation of the subject cybersecurity alert. For instance, in a non-limiting example, S210 may function to identify a first cybersecurity alert (or a representation of the first cybersecurity alert) as a first alert suppression candidate based on identifying an analyst input selecting the first cybersecurity alert (or the representation of the first cybersecurity alert).

Additionally, or alternatively, in another non-limiting example, S210 may function to recognize a second cybersecurity alert (or a representation of the second cybersecurity alert) as an alert suppression candidate based on identifying an analyst input selecting the second cybersecurity alert (or the representation of the second cybersecurity alert), as shown generally by way of example in FIG. 5.

It shall be noted that S210 may function to detect alert suppression candidates from subscribers to the system 100 and/or the method 200 in analogous ways.

2.20 Instantiating an Alert Suppression Configuration User Interface

S220, which includes instantiating an alert suppression configuration user interface, may function to instantiate an alert suppression configuration user interface that may provide a capability of configuring one or more alert suppression parameters, one or more computer-executable alert suppression instructions, and/or heuristics. In one or more embodiments, S220 may function to instantiate an alert suppression configuration user interface in a plurality of modes as described in more detail herein.

Alert suppression parameters, heuristics, and/or instructions, when deployed, may function to govern an operation of the automated security alert engine by automatically suppressing and/or automatically disposing of inbound cybersecurity alerts and/or cybersecurity events that satisfy the alert suppression parameters, heuristics, and/or instructions. Additionally, or alternatively, in one or more embodiments, the alert suppression parameters, heuristics, and/or instructions, when deployed, may function to govern an operation of an alert suppression engine implemented downstream of the security alert engine that may function to automatically suppress and/or automatically dispose of cybersecurity alerts generated or published by the security alert engine that satisfy the alert suppression parameters and/or heuristics.

It shall be noted that, in one or more embodiments, the cybersecurity alerts suppressed by the system 100 and/or the method 200 may still be accessible/viewable by an analyst or the like but are automatically closed (e.g., not pending, not investigated, etc.).

Fast-Instantiation of Alert Suppression Configuration User Interface

Figure 6A:
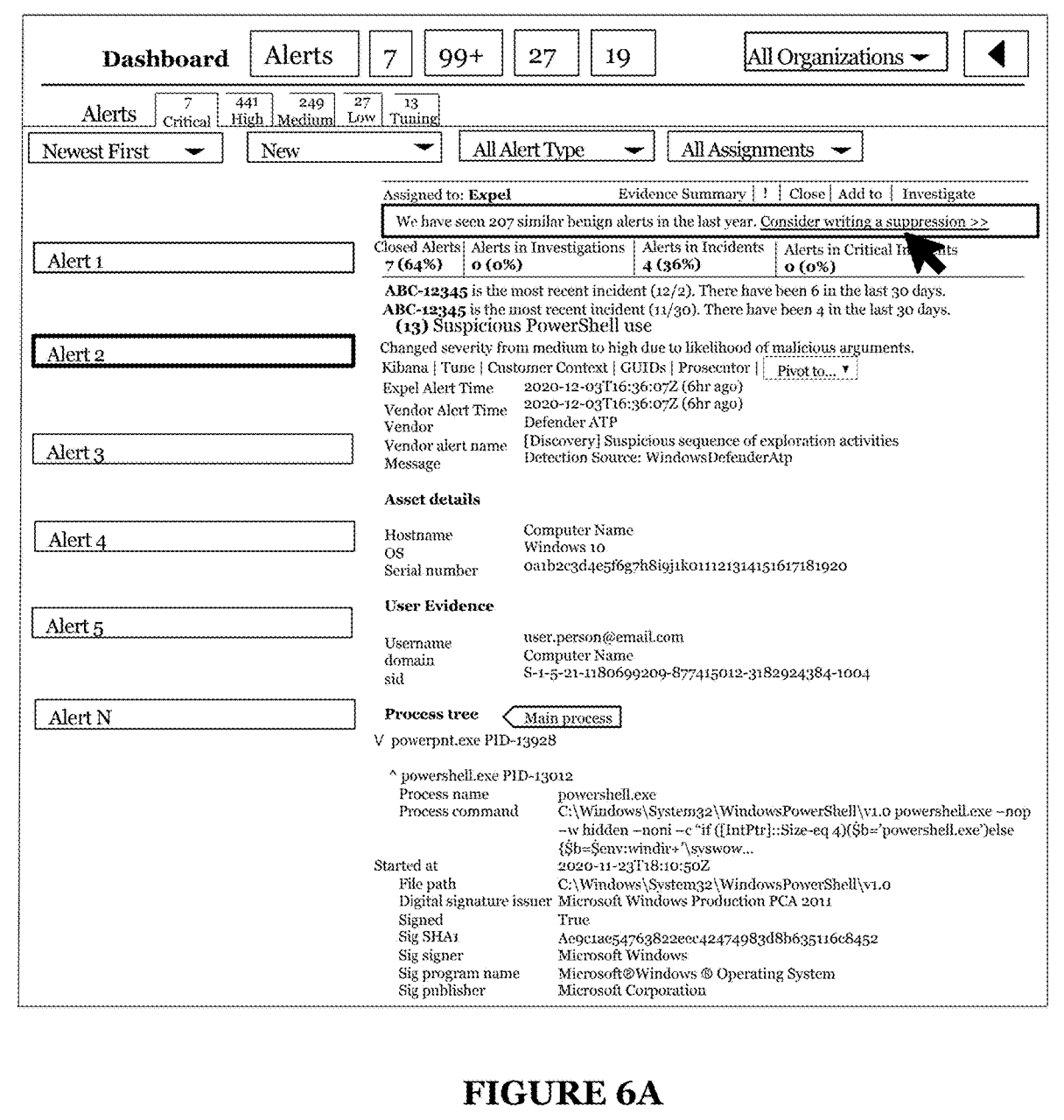
Figure 6B:
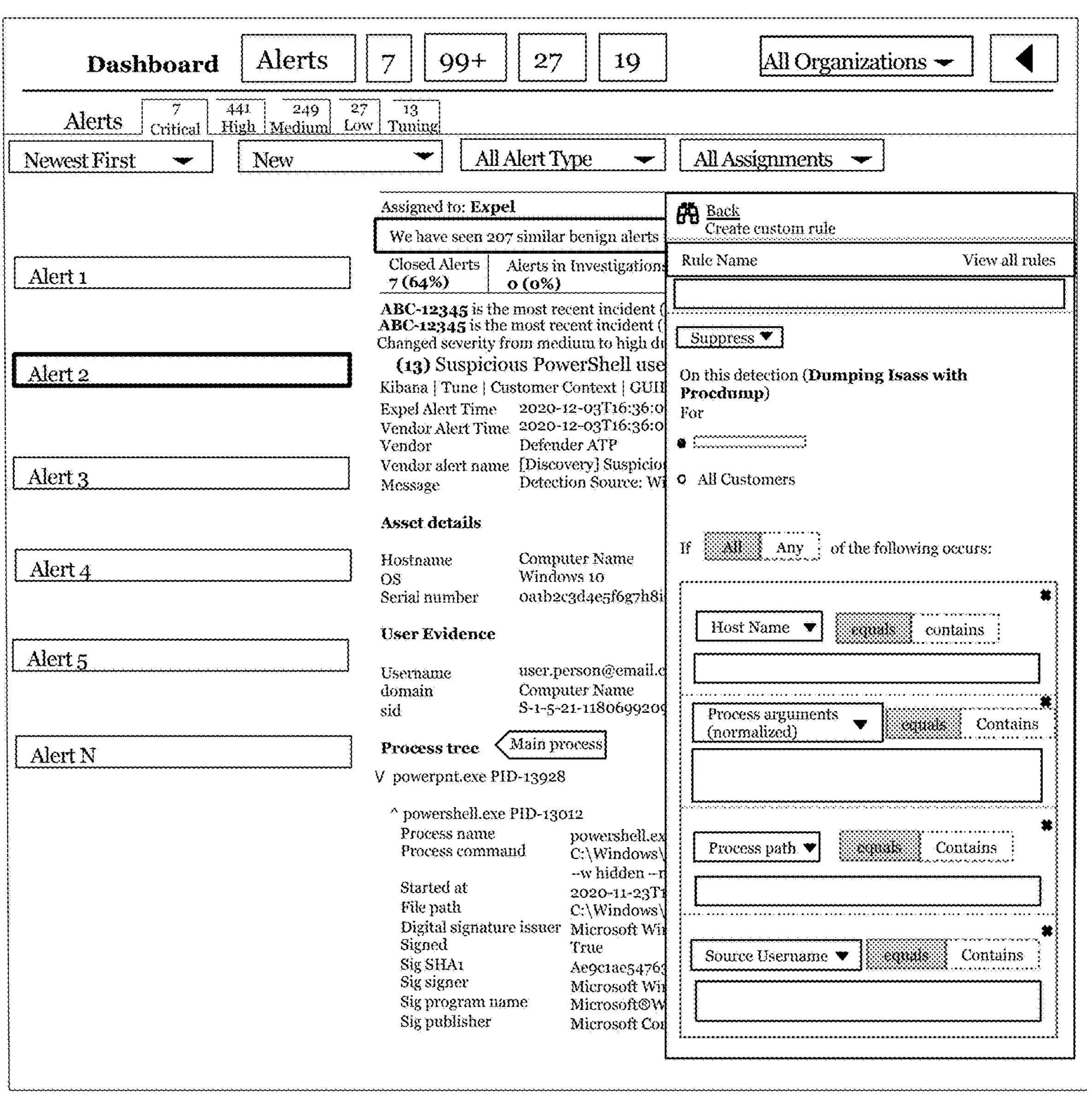

In a first implementation, S220 may function to instantiate, via one or more computers, an alert suppression configuration user interface in response to detecting an input from an analyst or the like selecting a selectable hyperlink, element, and/or object of the alert suppression user interface element. In one or more embodiments of the first implementation, the alert suppression user interface element may include one or more text strings that may be designed for slot filling, one or more tokens of text that may indicate a rationale that indicates why a target cybersecurity alert may have been identified as an alert suppression candidate, and/or a selectable hyperlink that, when selected, automatically instantiates the alert suppression configuration user interface, as shown generally by way of example in FIG. 6A and FIG. 6B.

For instance, in a non-limiting example, the one or more text strings of the alert suppression user interface element that may be displayed within an exemplarily cybersecurity alert windowpane may be "We have seen 207 similar benign alerts in the last year. Consider writing a suppression." In such non-limiting example, the portion of the one or more text strings associated with "Consider writing a suppression." may be selectable by an analyst or the like, and when selected may activate or instantiate the alert suppression configuration user interface, as shown generally by way of example in FIGS. 6A and 6B.

It shall be noted that the alert suppression configuration user interface, when instantiated, may be positioned on any suitable user interface of the system 100 and at any position on those suitable user interfaces. In one or more embodiments, S220 may function to instantiate (or activate) the alert suppression configuration user interface on at least a portion of a user interface where the alert suppression configuration user interface activation signal was detected. For instance, with continued reference to the above non-limiting example, S220 may function to detect an alert suppression configuration user interface activation signal based on an analyst or the like selecting the selectable portion "consider writing a suppression" within the alert user interface and, in response to the selection, S220 may function to concurrently and/or simultaneously display both the alert suppression configuration user interface and the alert user interface, as shown generally by way of example in FIG. 6A and FIG. 6B.

Figure 7A:
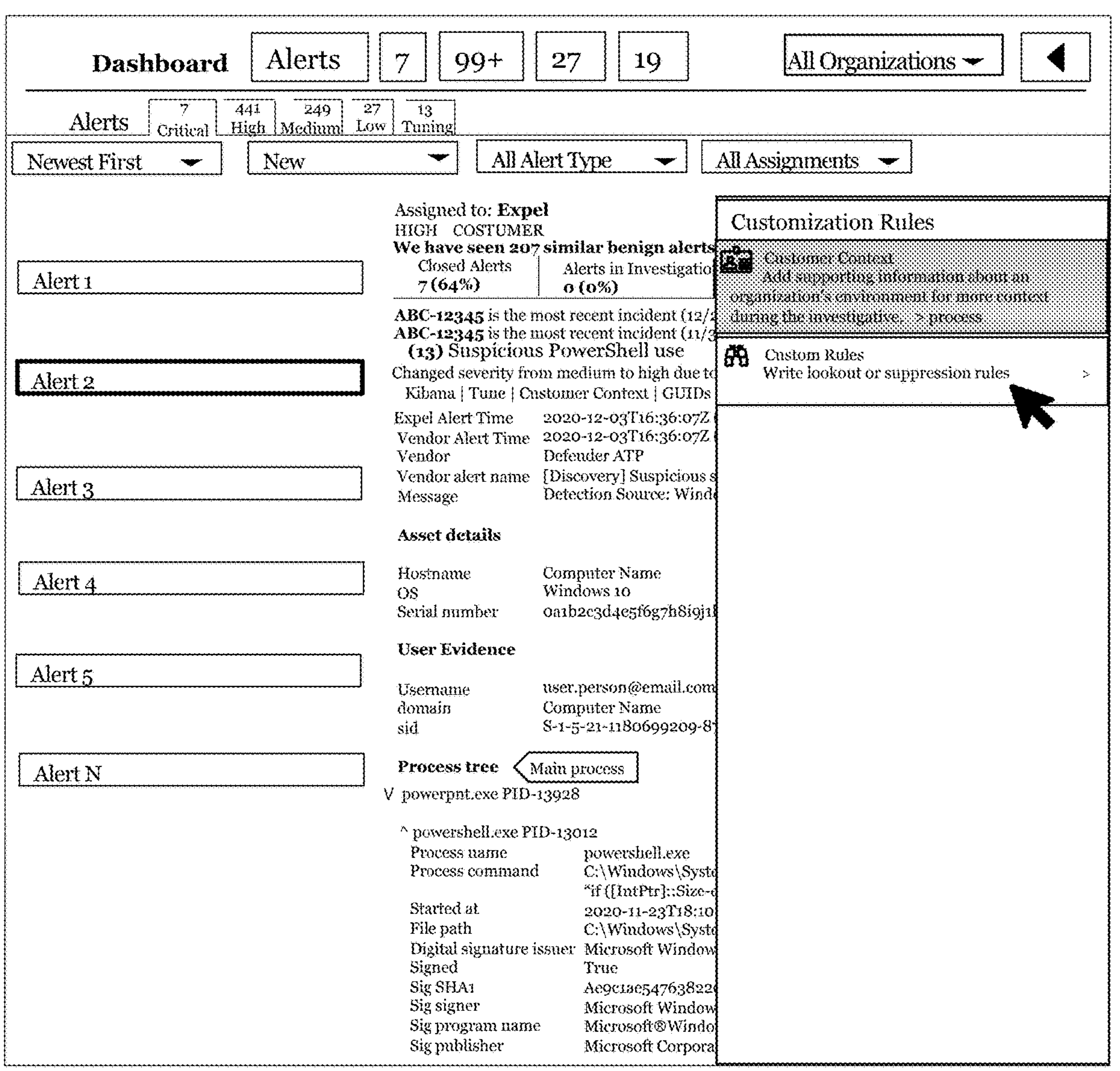
FIGS. 7A and 7B illustrates an example representation of instantiating an alert suppression configuration user interface in accordance with one or more embodiments of the present application.
Figure 7B:
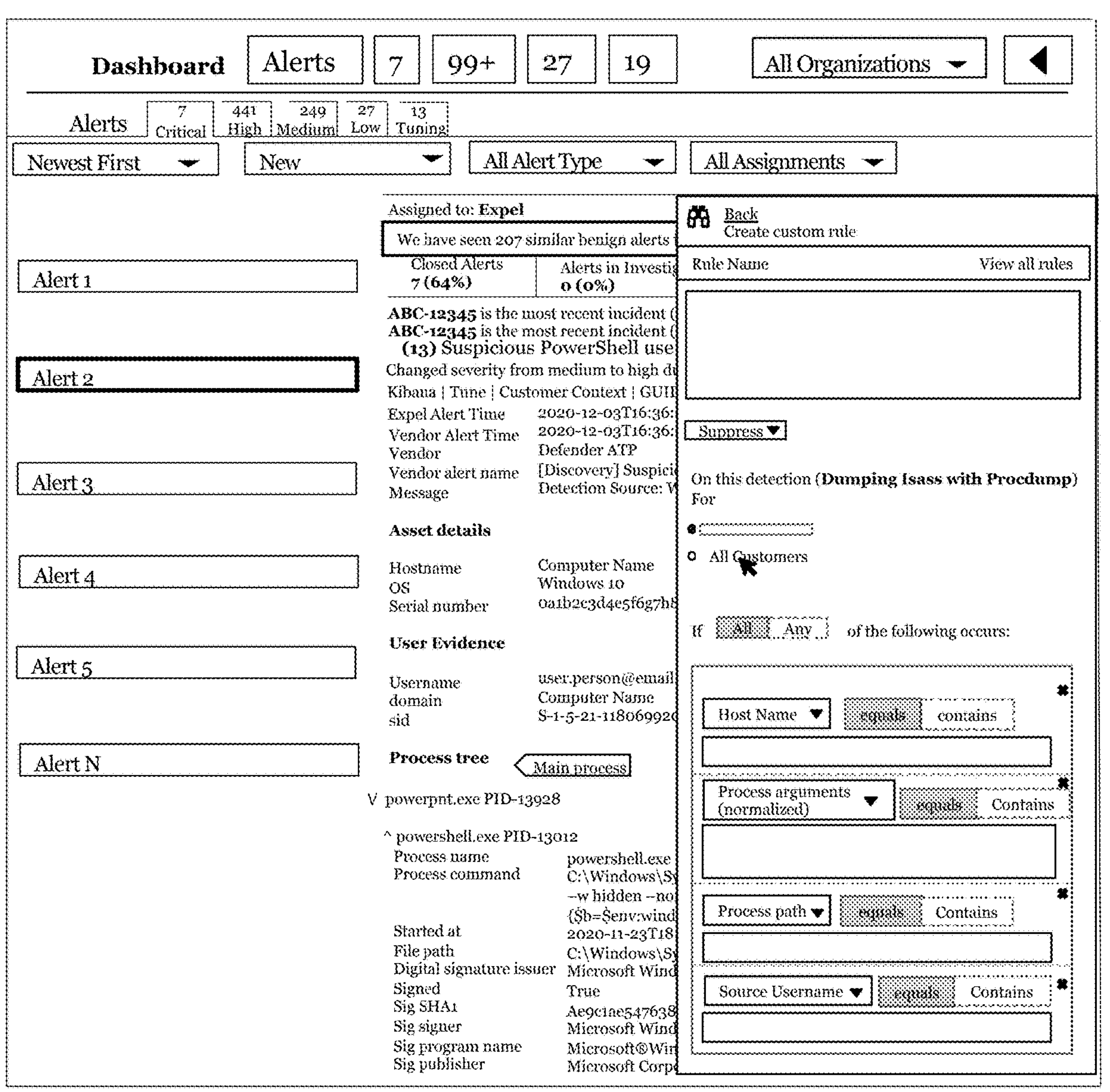

Instantiation of Alert Suppression Configuration User Interface Via a Cybersecurity Intelligence Menu Additionally, or alternatively, in a second implementation, S220 may function to instantiate an alert suppression configuration user interface in response to detecting an input from an analyst or the like selecting a selectable object of a cybersecurity intelligence user interface menu that corresponds to configuring alert suppressions, as shown generally by way of example in FIG. 7A and FIG. 7B.

In one or more embodiments, S220 may function to display a cybersecurity intelligence menu that may include a first selectable object that, when selected, may instantiate a first distinct user interface and a second selectable object that, when selected, may instantiate the alert suppression configuration user interface. It shall be noted that the alert suppression configuration user interface instantiated in the second implementation may be similar or equivalent to the alert suppression configuration user interface instantiated in the first implementation even though the user input and/or sequence of user inputs between the first implementation and the second implementation may be distinct.

It shall be further noted that the alert suppression configuration user interface of the second implementation, when instantiated, may be positioned on any suitable user interface of the system 100 and at any position on those suitable user interfaces in analogous ways as described above.

Layout of Alert Suppression Configuration User Interface

In one or more embodiments, an arrangement or layout of the alert suppression configuration user interface may include a plurality of distinct regions or portions that corresponds to a plurality of distinct alert suppression configuration stages, respectively. The distinct regions or portions of the alert suppression configuration user interface may collectively enable analysts or the like to intuitively configure (provisory) alert suppression parameters for a target provisory computer-executable alert suppression instruction, simulate the (provisory) alert suppression parameters, tune or refine the (provisory) alert suppression parameters, re-simulate the tuned or refined (provisory) alert suppression parameters, submit the (provisory) alert suppression parameters for approval or review, and/or implementing (e.g., deploy) the (provisory) alert suppression parameters into production, as described in more detail herein.

In one or more embodiments, an alert suppression configuration user interface may include a plurality of distinct regions. In such embodiments, the alert suppression configuration user interface may include an alert suppression configuration region that operably communicates with an alert suppression configuration module (e.g., alert suppression configuration engine) that may enable a target user a capability of configuring one or more alert suppression parameters of a computer-executable alert suppression instruction based on receiving one or more inputs from the target user at the alert suppression configuration region. Additionally, or alternatively, in such embodiments, the alert suppression configuration user interface may include an alert suppression simulation region that operably communicates with an alert suppression simulation module (e.g., alert suppression simulation engine) that may enable the target user a capability of executing and/or performing the one or more alert suppression simulations (e.g., computer-based simulations) based on receiving one or more inputs from the target user at the alert suppression simulation region. Additionally, or alternatively, in such embodiments, the alert suppression configuration user interface may include an alert suppression deployment region that operably communicates with an alert suppression deployment module (e.g., an alert suppression deployment engine) that enables the target user a capability of implementing the computer-executable alert suppression instruction into the subscriber-specific cybersecurity environment based on receiving one or more inputs from the target user at the alert suppression deployment region.

In one or more embodiments, an alert suppression configuration user interface may include a plurality of distinct regions and/or a plurality of distinct portions. In such embodiments, the alert suppression configuration user interface may include an alert suppression configuration region that enables a target user a capability of configuring one or more alert suppression parameters of the computer-executable alert suppression instruction based on receiving one or more inputs from the target user at the alert suppression configuration region; an alert suppression simulation region that enables the target user a capability of executing the one or more alert suppression simulations based on receiving one or more inputs from the target user at the alert suppression simulation region, and/or an alert suppression deployment region that enables the target user a capability of implementing the computer-executable alert suppression instruction into the subscriber-specific cybersecurity environment based on receiving one or more inputs from the target user at the alert suppression deployment region.

Stated another way, the alert suppression configuration user interface may intelligently include the user interface objects, modules, engines, and/or components necessary to configure and/or deploy alert suppression parameters or heuristics, which, in turn, reduces the likelihood that analysts, subscribers, or the like will need to navigate to a plurality of distinct user interfaces to configure and/or deploy alert suppression parameters and/or heuristics.

2.30 Configuring Provisory Alert Suppression Parameters

S230, which includes configuring provisory alert suppression parameters, may function to configure, via the instantiated alert suppression configuration user interface, one or more provisory alert suppression parameters based on a target alert suppression candidate. In one or more embodiments, provisory alert suppression parameters, as referred to herein, may be experimental alert suppression conditions and/or criteria that may be used during a testing/simulation stage. In one or more embodiments, provisory alert suppression parameters may not be actively deployed in a production environment of the system 100 implementing the method 200 until a successful simulation or testing is performed. As described in more detail herein, provisory alert suppression parameters may be configured automatically by the cybersecurity threat detection and mitigation service and/or by an analyst or subscriber associated with the service 100.

Automated Configuration of Provisory Alert Suppression Parameters

Figure 8:
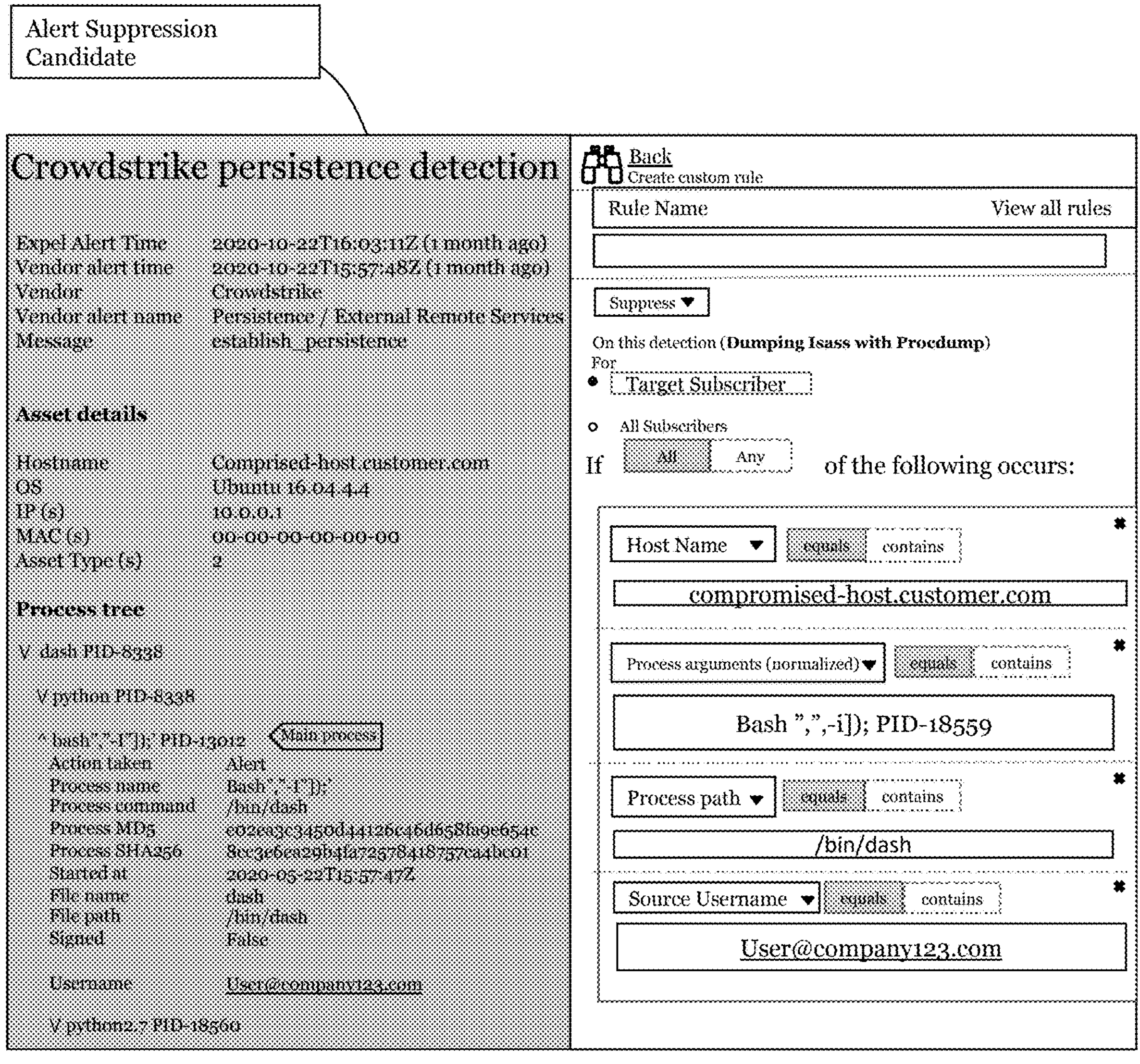
FIG. 8 illustrates an example representation of an instantiated and pre-populated alert suppression configuration user interface in accordance with one or more embodiments of the present application.

In a first implementation, when instantiating the alert suppression configuration user interface, S230 may function to automatically prepopulate one or more alert suppression data fields of a plurality of distinct alert suppression data fields and, for each prepopulated alert suppression data field, S230 may function to automatically extract appropriate alert data from the target alert suppression candidate and selectively install or encode the appropriate alert data into each prepopulated alert suppression data field, as shown generally by way of example in FIG. 8.

In one or more embodiments of the first implementation, S230 may function to automatically pre-populate alert suppression data fields based on the type or category of the target alert suppression candidate. For instance, in a non-limiting example, when instantiating the alert suppression configuration user interface for a target alert suppression candidate of a first type, S230 may function to automatically prepopulate a first (set of) alert suppression data fields and selectively install/encode appropriate alert data corresponding to the target alert suppression candidate into each prepopulated alert suppression data field. In another non-limiting example, when instantiating the alert suppression configuration user interface for a target alert suppression candidate of a second type, S230 may function to automatically prepopulate a second (set of) alert suppression data fields and selectively install/encode appropriate alert data corresponding to the target alert suppression candidate into each prepopulated alert suppression data field.

It shall be noted that the alert suppression data fields that S230 may function to prepopulate when instantiating the alert suppression configuration user interface may include, but not limited to, a "destination port" alert suppression data field, a "destination username" alert suppression data field, a "domain" alert suppression data field, an "email address" alert suppression data field, a "file path" alert suppression data field, a "hostname" alert suppression data field, a "process path" alert suppression data field, a "security device" alert suppression data field, a "source IP address" alert suppression data field, a "source port" alert suppression data field, a "source username" alert suppression data field, a "URL" alert suppression data field, a "user agent" alert suppression data field, a "username" alert suppression data field, a "vendor alert description" alert suppression data field, a "vendor alert message" alert suppression data field, a "vendor alert name" alert suppression data field, a "vendor name" alert suppression data field, and/or any other suitable alert suppression data field.

Figure 13:
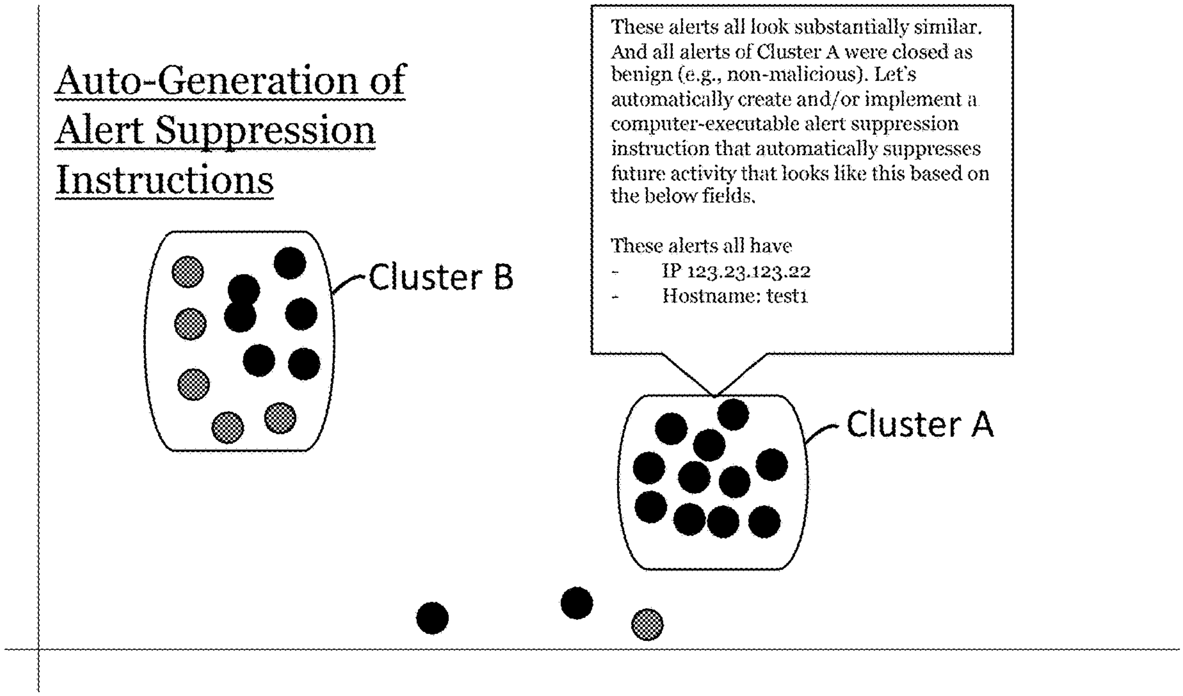
FIG. 13 illustrates an example representation of automatically generating a computer-executable alert suppression instruction based on a target cluster of cybersecurity alert data.

In one or more embodiments, S230 may function to automatically construct or generate a computer-executable alert suppression instruction. In such embodiments, the system or service implementing the method 200 may function to automatically identify that a target cybersecurity alert (e.g., a real-time or near real-time cybersecurity alert) corresponds to (e.g., substantially equivalent, substantially similar, etc.) to a plurality of historical, non-malicious cybersecurity alerts based on (e.g., automatically) evaluating, via one or more processors, the target cybersecurity alert against one or more corpora of historical cybersecurity alert data and/or one or more clusters of cybersecurity alerts. Accordingly, in one or more embodiments, the system or service 100 implementing the method 200 may function to identify (e.g., extract, etc.) one or more pieces of alert metadata or a plurality of distinct pieces of alert metadata that corresponds to each of the plurality of historical, non-malicious cybersecurity alerts and/or the target cybersecurity alert (e.g., all alerts of the plurality of historical, non-malicious cybersecurity alerts have the same IP address (e.g., 123.23.123.22), all alerts of the plurality of historical, non-malicious cybersecurity alerts have the same hostname (e.g., hostname A), all alerts of the plurality of historical, non-malicious cybersecurity alerts have the same vendor alert name (e.g., Crowdstrike), etc.), as shown generally by way of example in FIG. 13. Thus, in one or more embodiments, based on identifying the one or more pieces of alert metadata that corresponds to each of the plurality of historical, non-malicious cybersecurity alerts and/or the target cybersecurity alert, S230 may function to automatically construct, via the one or more processors, a computer-executable event suppression instruction based on the identifying of the one or more pieces of alert metadata in which each distinct piece of alert metadata of the one or more pieces of alert metadata defines a distinct alert suppression parameter of the computer-executable alert suppression instruction.

Configuring Provisory Alert Suppression Parameters via Analyst Input

Additionally, or alternatively, in a second implementation, S230 may function to configure one or more provisory alert suppression parameters based on detecting one or more user inputs or a sequence of user inputs from an analyst or the like within the alert suppression configuration user interface. In operation, while displaying the alert suppression configuration user interface, a security analyst or the like may function to modify a pre-populated (provisory) alert suppression parameter (e.g., edit an alert suppression data field from a first value to a second value), augment the pre-populated (provisory) alert suppression parameters to include one or more additional alert suppression parameters, and/or remove (e.g., delete or the like) one or more of the pre-populated (provisory) alert suppression parameters.

Figure 9:
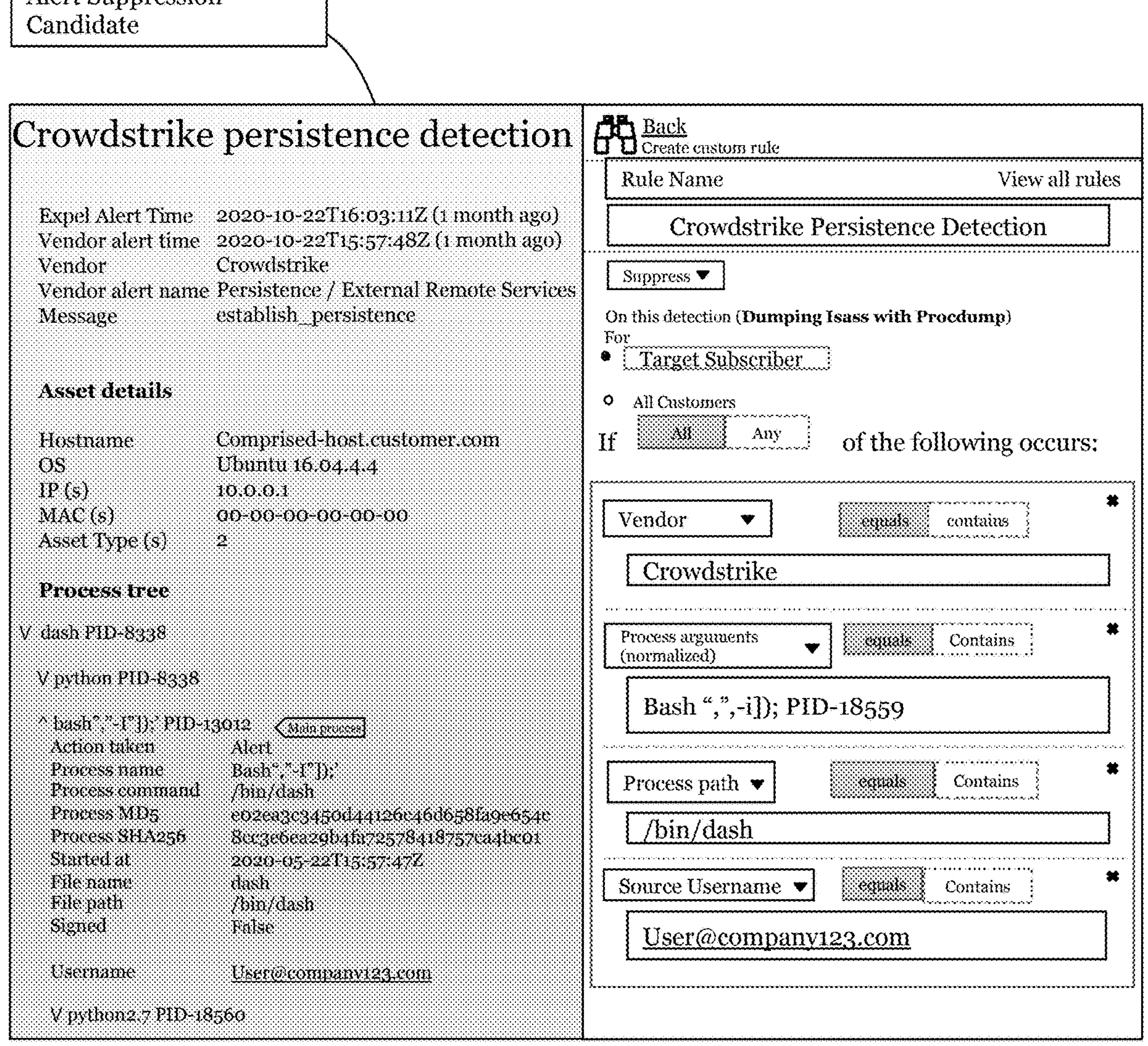
FIG. 9 illustrates an example representation of modifying an alert suppression configuration user interface in accordance with one or more embodiments of the present application.

It shall be noted that, in response to receiving an input from an analyst or the like that corresponds to adding an alert suppression data field of a target type (e.g., a "destination username" alert suppression data field, etc.), S230 may function to (automatically) pre-populate, via one or more processors, applicable alert data from the target alert suppression candidate within the newly added alert suppression data field. Additionally, or alternatively, in response to receiving an input form an analyst or the like that corresponds to modifying a pre-existing alert suppression data field from a first type to a second type (e.g., a "destination username" alert suppression data field to an "email address" alert suppression data field, etc.), S230 may function to pre-populate, via one or more processors, alert data from the target alert suppression candidate within the subject alert suppression data field associated with the modification, as shown generally by way of example in FIG. 8 and FIG. 9.

It shall be further noted that, in the first implementation and/or the second implementation, the provisory alert suppression parameters may be configured for a target subscriber to the system/service 100 or the provisory alert suppression parameters may be configured across a majority, or the entire subscriber base of the system or service 100.

Figure 10:
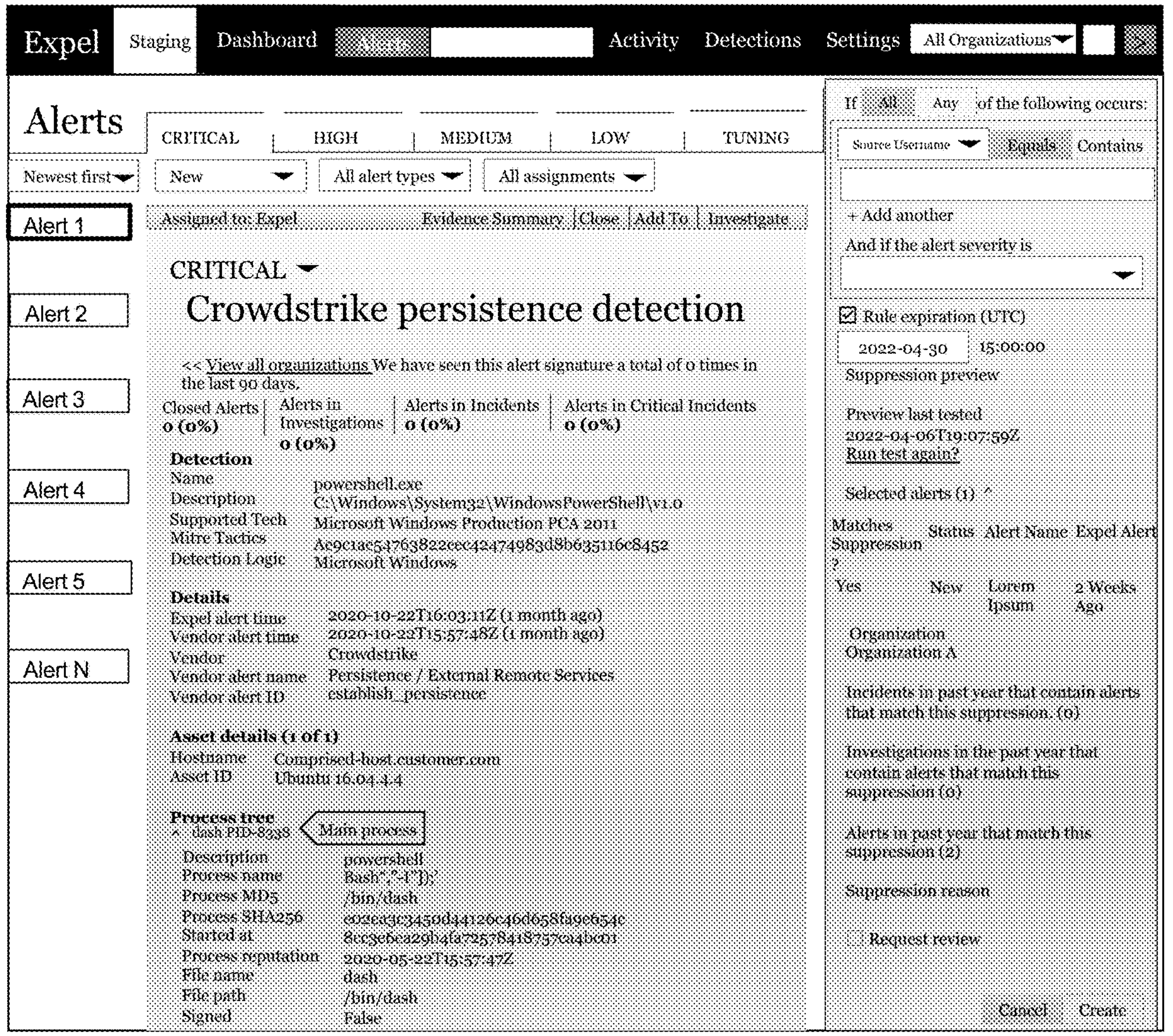
FIG. 10 illustrates an example representation of configuring an alert suppression expiration date parameter in accordance with one or more embodiments of the present application.

It shall be further noted that, in the first implementation and/or the second implementation, one of the provisory alert suppression parameters configured by S230 may be an alert suppression expiration date parameter (e.g., the provisory alert suppression parameters may be active for only the next 30 days, only the next 90 days, only the next 365 days, or any other suitable number of days, as shown generally by way of example in FIG. 10.

It shall be noted that, in one or more embodiments, S230 may function to configure a computer-executable alert suppression instruction in analogous ways.

2.40 Performing Intelligent Alert Suppression Simulations

S240, which includes performing intelligent alert suppression simulations, may function to perform one or more alert suppression simulations using the configured provisory alert suppression parameters as simulation parameters. In one or more embodiments, S230 may function to simulate or test the provisory alert suppression parameters with historical alert/event data of a predetermined time window and the output(s) or result(s) of the simulation or testing may inform potential reconfigurations or tuning of the provisory alert suppression parameters, if needed.

Figure 11:
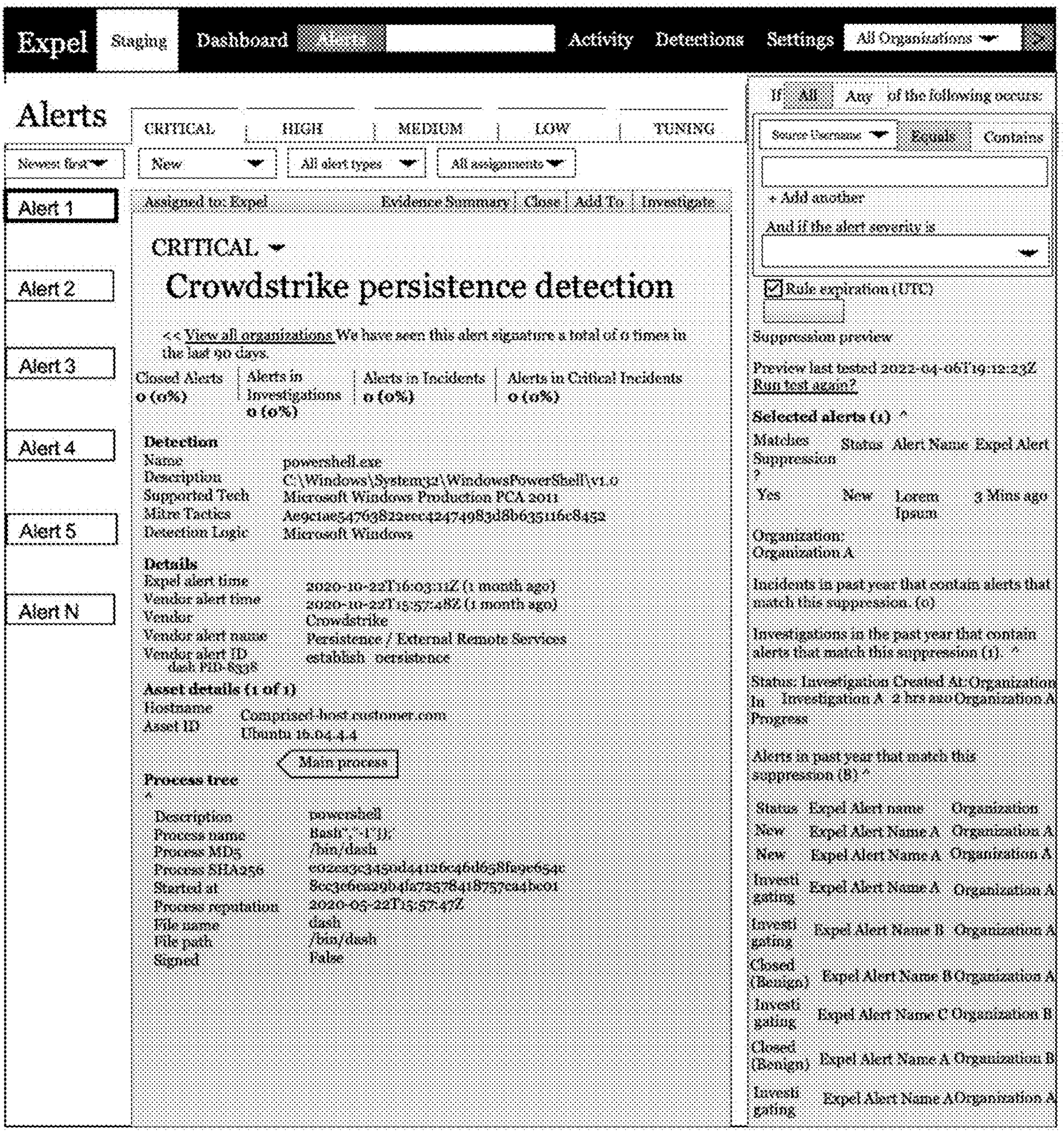
FIG. 11 illustrates an example representation of displaying alert suppression simulation results in accordance with one or more embodiments of the present application.

In a preferred embodiment, the one or more alert suppression simulations may be initiated via the alert suppression configuration user interface and the results of the one or more alert suppression simulations may be displayed on the alert suppression configuration user interface, as shown generally of example in FIG. 11. Intelligent alert suppression simulations may provide a probative indication or signal to the cybersecurity threat detection and mitigation service, an analyst and/or the like on whether the provisory alert suppression parameters should be deployed into production and/or reconfigured before implementing into production.

In one or more embodiments, S240 may function to (e.g., automatically) perform and/or execute, via one or more processors, one or more alert suppression simulations based on a target computer-executable alert suppression instruction (e.g., a computer-executable alert suppression heuristic or the like). In one or more embodiments, each of the one or more alert suppression simulations may include automatically assessing one or more corpora of historical cybersecurity alert data of a predetermined time span against the computer-executable alert suppression instruction and automatically compute, via one or more processors, a plurality of distinct cybersecurity threat-informative simulations metrics based on the automatic assessing of the one or more corpora of historical cybersecurity alert data against the computer-executable alert suppression instruction.

Alert Suppression Simulation Results

In one or more embodiments, the result or outcome of the alert suppression simulation may confirm or disconfirm whether the provisory alert suppression parameters would have suppressed the target (or intended) alert suppression candidate. In one or more embodiments, if S240 determines that the currently configured provisory alert suppression parameters would not have suppressed the target alert suppression candidate, S240 may function to display, via one or more processors, a notification that may inform an analyst or the like of such event.

Additionally, or alternatively, in one or more embodiments, the result or outcome of the (e.g., computer-based) alert suppression simulation may identify a quantity of historical alerts that match the provisory alert suppression parameters and that caused or triggered a cybersecurity incident, as shown generally by way of example in FIG. 11. In such embodiments, S230 may function to display the quantity of historical alerts on the alert suppression configuration interface and optionally the corresponding collection of historical alerts underpinning the quantity of historical alerts triggering or causing the cybersecurity incident, if any. Stated differently, in one or more embodiments, S240 may function to compute a numerical quantity of malicious cybersecurity alerts (e.g., malicious cybersecurity alerts that caused a cybersecurity incident) that the computer-executable alert suppression instruction, if retroactively implemented, would have automatically suppressed or automatically disposed.

Additionally, or alternatively, in one or more embodiments, the result or outcome of the (e.g., computer-based) alert suppression simulation may identify a quantity of historical alerts that match the provisory alert suppression parameters and that caused or triggered a cybersecurity investigation, as shown generally by way of example in FIG. 11. In such embodiments, S230 may function to display the quantity of historical alerts on the alert suppression configuration interface that resulted in the cybersecurity investigation and optionally the corresponding collection of historical alerts underpinning the quantity of historical alerts triggering or causing the cybersecurity investigation, if any. Stated differently, in one or more embodiments, S240 may function to compute, via one or more processors, a numerical quantity of cybersecurity investigations that the cybersecurity event detection and response service would have inadvertently bypassed based on identifying a subset of investigation-required cybersecurity alerts of the corpus of historical cybersecurity alert data that the computer-executable alert suppression instruction, if retroactively implemented, would have automatically suppressed or automatically disposed.

Additionally, or alternatively, in one or more embodiments, the result or outcome of the (e.g., computer-based) simulation may identify a quantity of historical alerts matching the provisory alert suppression parameters, as shown generally by way of example in FIG. 11. In such embodiments, S230 may function to display the quantity of historical alerts on the alert suppression configuration interface and optionally the corresponding collection of historical alerts underpinning the quantity of historical alerts that match the provisory alert suppression parameters.

It shall be noted that, in one or more embodiments, S240 may function to perform one or more computer-based simulations of a target computer-executable alert suppression instruction in analogous ways.

Tuning and Re-Simulating the Provisory Alert Suppression Parameters

Optionally, in one or more embodiments, S240 may function to modify (e.g., fine-tune, augment, reduce, etc.) the provisory alert suppression parameters and perform one or more additional alert suppression simulations based on the modified provisory alert suppression parameters.

For instance, in a non-limiting example, based on the results of a prior simulation or test exposing that the provisory alert suppression parameters would have suppressed one or more historical cybersecurity alerts that resulted in a cybersecurity incident and/or one or more historical cybersecurity alerts that resulted in a cybersecurity investigation, an analyst, a subscriber, and/or the system or service 100 may function to iteratively modify the provisory alert suppression parameters until the results of the simulation would not have suppressed historical cybersecurity alerts that resulted in a cybersecurity incident and/or historical cybersecurity alerts that resulted in a cybersecurity investigation.

2.50 Deploying Provisory Alert Suppression Parameters

S250, which includes deploying provisory alert suppression parameters, may function to deploy the provisory alert suppression parameters into a production state based on a successful simulation using the provisory alert suppression parameters. In operation, S250 may function to convert the provisory alert suppression parameters to one or more in-production/active suppression heuristics based on one or more successful simulations (e.g., satisfying simulation thresholds/criteria).

In one or more embodiments, S250 may function to implement, via one or more processors, a target computer-executable alert suppression instruction (e.g., a target computer-executable alert suppression heuristic, etc.) into one or more subscriber-specific cybersecurity environments of the cybersecurity event detection and response service based on at least a subset of the plurality of distinct cybersecurity threat-informative simulation metrics satisfying one or more cybersecurity threat-informative efficacy thresholds. In a non-limiting example, S250 may function to implement a target computer-executable alert suppression instruction into a target subscriber-specific cybersecurity environment of the cybersecurity event detection and response service that corresponds to a subscriber of a cybersecurity alert to which the target computer-executable alert suppression instruction corresponds. In another non-limiting example, S250 may function to implement a target computer-executable alert suppression instruction into a plurality of distinct subscriber-specific cybersecurity environments that corresponds to a plurality of distinct subscribers to the cybersecurity event detection and response service.

Alert Suppression Review

Optionally, in one or more embodiments, prior to deploying an alert suppression heuristic, S250 may function to execute an alert suppression review workflow that may electronically transmit the provisory alert suppression parameters the results of the simulation based on the provisory alert suppression parameters, and/or a reason for the alert suppression to a target analyst for review.

In one or more embodiments, S250 may function to convert the provisory alert suppression parameters to an in-production/active suppression heuristic based on the system or service 100 receiving an approval data signal associated with the target analyst review. In such embodiments, based on receiving or identifying the approval signal, S250 may function to automatically write or encode the in-production/active suppression heuristic to the security alert engine or the alert suppression engine downstream of the security alert engine to govern a suppression operation thereof.

It shall be noted that, in one or more embodiments, S250 may function to forego converting the provisory alert suppression parameters to an in-production/active suppression heuristic based on the system or service 100 receiving a decline or non-approval data signal associated with the target analyst review.

It shall be noted that, in one or more embodiments, S250 may function to implement or deploy a target computer-executable alert suppression instruction in analogous ways.

Evaluation of Live or Inbound Alert/Event Data Signals

In one or more embodiments, a suppression module of the security alert engine or the alert suppression engine may function to evaluate inbound (or live) alert data signals and/or inbound (or live) event data signals against suppression criteria (e.g., alert suppression parameters, alert suppression heuristics, computer-executable alert suppression instructions, etc.) of the security alert engine or the alert suppression engine.

Accordingly, S250 may function to suppress one or more inbound cybersecurity alerts if the one or more inbound cybersecurity alerts satisfy suppression criteria of the security alert engine or the alert suppression engine (e.g., satisfy alert suppression criteria of a computer-executable alert suppression instruction, satisfy alert suppression criteria of a computer-executable alert suppression heuristic, etc.). It shall be noted that suppressing an inbound cybersecurity alert does not prevent the security alert engine from generating a security alert and/or from being viewable by an analyst or the like. Stated another way, S250 may function to (e.g., automatically) suppress the one or more inbound cybersecurity alerts that satisfy suppression criteria by automatically deescalating (e.g., closing) the one or more inbound cybersecurity alerts that satisfy suppression criteria (e.g., alert suppression parameters, alert suppression heuristics).

Figure 12:
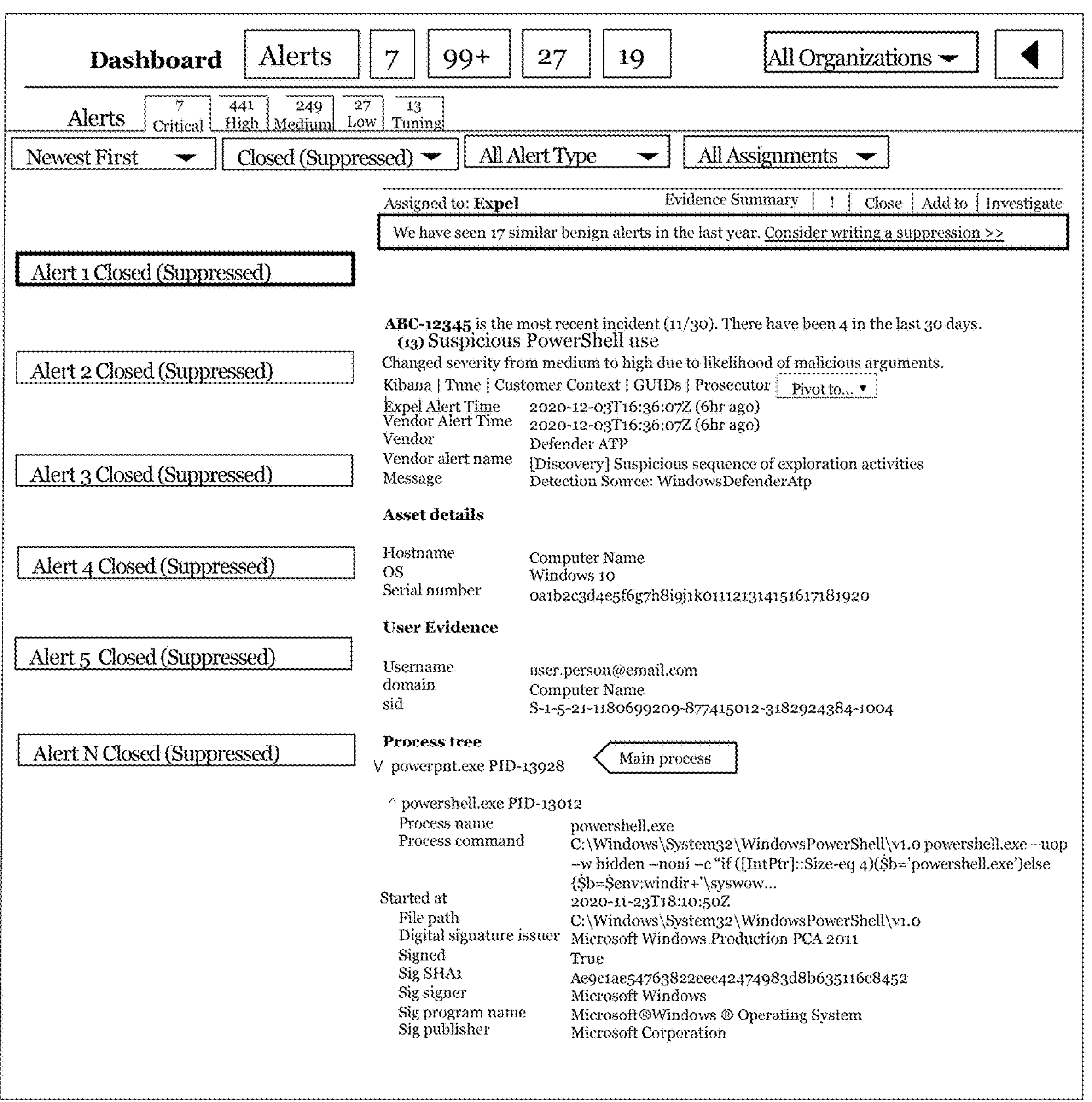
FIG. 12 illustrates an example representation of displaying, via an internet-accessible alert user interface, cybersecurity alerts that were suppressed by a cybersecurity threat detection and mitigation in accordance with one or more embodiments of the present application.

Additionally, in one or more embodiments, for each cybersecurity alert that was automatically closed (or suppressed) as a result of satisfying suppression criteria (e.g., one or more suppression heuristics, parameters, etc.), S250 may function to add a metadata tag to the cybersecurity alert that indicates that a subject cybersecurity alert was closed via suppression and optionally includes a link to the one or more suppression heuristics that caused the suppression, as shown generally by way of example in FIG. 12.

Alert Suppression Stopping Criteria|Alert Suppression Continuation Criteria

It shall be noted that, in one or more embodiments, S250 may function to stop or terminate an in-production/active suppression heuristic in response to S250 identifying or determining that the in-production/active suppression heuristic is anomalous (e.g., suppressing inbound cybersecurity alerts that resulted in a cybersecurity investigation and/or a security incident) and/or stale.

In one or embodiments, S250 may function to implement a machine learning-based classification model that may predict whether an active suppression heuristic or the like may be stale or otherwise, may no longer be a good suppression heuristic resulting in suppressing valid cybersecurity alerts. In such embodiments, S250 may function to evaluate to active suppression heuristics on a periodic basis and in such evaluations, provide features of distinct active suppression heuristics, as model input, to machine learning-based classification model that produces a distinct inference for each suppression heuristic indicating a likelihood or probability that the suppression heuristic may be stale (e.g., not good, blocking valid alerts) or not stale (e.g., good, blocking only benign alerts, or the like). In a circumstance in which the distinct inference or prediction relating to a staleness of a target suppression heuristic satisfies a suppression heuristic review threshold or suppression heuristic discontinuation threshold, S250 may function to automatically surface the suppression heuristic as a candidate for termination or in some embodiments, if or when the distinct inference may be severe (e.g., a degree in which the inference value surpasses a severity threshold), S250 may function to automatically terminate the suppression heuristic without analyst intervention or review.

It shall be noted that, in one or more embodiments, S250 may function to automatically terminate a cancelation of an in-production/active suppression heuristic nearing expiration (e.g., nearing an alert suppression expiration date parameter) based on S250 identifying or determining that the target in-production/active suppression heuristic satisfies suppression continuation criterion (e.g., the in-production/active suppression heuristic is suppressing alerts as intended).

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A computer-implemented method for accelerating a configuration and deployment of automated event suppression instructions, the computer-implemented method comprising:

at a cybersecurity event detection and response service:

identifying, via one or more processors, an event suppression candidate based on identifying a cybersecurity event that satisfies automated event suppression criteria of the cybersecurity event detection and response service;

constructing, via the one or more processors, a first computer-executable event suppression instruction based on event data or event features of the cybersecurity event;

performing, via the one or more processors, a first event suppression simulation of a plurality of event suppression simulations based on the first computer-executable event suppression instruction, wherein each of the plurality of event suppression simulations include:

(a) automatically assessing one or more corpora of historical cybersecurity event data of a predetermined time span against the first computer-executable event suppression instruction; and (b) automatically computing a plurality of distinct cybersecurity threat-informative simulation metrics based on the automatic assessing of the one or more corpora of historical cybersecurity event data against the first computer-executable event suppression instruction;

identifying, via the one or more processors, one or more alert suppression parameters of the first computer-executable event suppression instruction contributed to the first event suppression simulation inadvertently suppressing one or more historical cybersecurity events included in the one or more corpora of historical cybersecurity event data that resulted in a security incident;

generating, via the one or more processors, a new iteration of the first computer-executable event suppression instruction by iteratively modifying the one or more alert suppression parameters of the first computer-executable event suppression instruction until the one or more historical cybersecurity events that resulted in the security incident are no longer suppressed;

performing, via the one or more processors, a second event suppression simulation of the plurality of event suppression simulations based on the new iteration of the first computer-executable event suppression instruction;

implementing, via the one or more processors, the new iteration of the first computer-executable event suppression instruction into one or more subscriber-specific cybersecurity environments of the cybersecurity event detection and response service based on simulation results outputted by the second event suppression simulation indicating that the new iteration of the first computer-executable event suppression instruction did not suppress the one or more historical cybersecurity events that resulted in the security incident;

after implementing the new iteration of the first computer-executable event suppression instruction into the one or more subscriber-specific cybersecurity environments:

computing, via a machine learning model, a machine learning-based inference based on providing a plurality of features of the new iteration of the first computer-executable event suppression instruction as input to the machine learning model, wherein the machine learning-based inference includes a probability of the new iteration of the first computer-executable event suppression instruction being stale; and automatically terminating the new iteration of the first computer-executable event suppression instruction implemented within the one or more subscriber-specific cybersecurity environments based on the probability satisfying an automated suppression discontinuation threshold.

2. The computer-implemented method according to claim 1, wherein:

identifying the cybersecurity event includes:

automatically assessing, via the one or more processors, a plurality of distinct clusters of cybersecurity event data; and automatically identifying, via the one or more processors, a target cluster of cybersecurity event data of the plurality of distinct clusters of cybersecurity event data that satisfies the automated event suppression criteria of the cybersecurity event detection and response service based on the assessing, wherein the target cluster of cybersecurity event data includes the cybersecurity event.

3. The computer-implemented method according to claim 2, wherein:

the target cluster of cybersecurity event data satisfies the automated event suppression criteria of the cybersecurity event detection and response service based on:

identifying, via the one or more processors, that each distinct cybersecurity event included in the target cluster of cybersecurity event data corresponds to a non-malicious cybersecurity event;

identifying, via the one or more processors, that a total quantity of cybersecurity events included in the target cluster of cybersecurity event data satisfies a service-defined cluster size threshold; and identifying, via the one or more processors, that a plurality of distinct pieces of event metadata corresponds to each distinct cybersecurity event of the target cluster of cybersecurity event data.

4. The computer-implemented method according to claim 3, wherein:

constructing the first computer-executable event suppression instruction includes:

automatically constructing, via the one or more processors, the first computer-executable event suppression instruction based on the identifying of the plurality of distinct pieces of event metadata that corresponds to each distinct cybersecurity event of the target cluster of cybersecurity event data, wherein each distinct piece of event metadata of the plurality of distinct pieces of event metadata defines a distinct alert suppression parameter of the first computer-executable event suppression instruction.

5. The computer-implemented method according to claim 1, further comprising:

automatically evaluating, via the one or more processors, the cybersecurity event against the one or more corpora of historical cybersecurity event data;

detecting, via the one or more processors, that the cybersecurity event corresponds to a plurality of historical, non-malicious cybersecurity events based on the evaluating, wherein a numerical quantity of the plurality of historical, non-malicious cybersecurity events satisfies an event suppression quantity threshold; and wherein the identifying the cybersecurity event is further based on the detecting.

6. The computer-implemented method according to claim 1, further comprising:

generating, via a machine learning-based clustering algorithm, a plurality of distinct cybersecurity event clusters based on the one or more corpora of historical cybersecurity event data, wherein each distinct cybersecurity event cluster of the plurality of distinct cybersecurity event clusters includes a plurality of distinct cybersecurity event representations that correspond to a plurality of distinct cybersecurity events;

identifying, via the one or more processors, that a vector representation of the cybersecurity event is within a threshold distance of a non-malicious cybersecurity event cluster of the plurality of distinct cybersecurity event clusters;

wherein the non-malicious cybersecurity event cluster satisfies the automated event suppression criteria of the cybersecurity event detection and response service; and wherein the identifying the event suppression candidate is further based on the identifying of the non-malicious cybersecurity event cluster.

7. The computer-implemented method according to claim 1, wherein:

automatically computing the plurality of distinct cybersecurity threat-informative simulation metrics include:

computing, via the one or more processors, a numerical quantity of malicious cybersecurity events that the first computer-executable event suppression instruction, if retroactively implemented, would have automatically suppressed or automatically disposed.

8. The computer-implemented method according to claim 1, wherein:

automatically computing the plurality of distinct cybersecurity threat-informative simulation metrics include:

computing, via the one or more processors, a numerical quantity of cybersecurity investigations that the cybersecurity event detection and response service would have inadvertently bypassed based on identifying a subset of investigation-required cybersecurity events of the one or more corpora of historical cybersecurity event data that the first computer-executable event suppression instruction, if retroactively implemented, would have automatically suppressed or automatically disposed.

9. The computer-implemented method according to claim 1, wherein:

implementing the new iteration of the first computer-executable event suppression instruction into the one or more subscriber-specific cybersecurity environments of the cybersecurity event detection and response service includes:

implementing the new iteration of the first computer-executable event suppression instruction into a target subscriber-specific cybersecurity environment that corresponds to a subscriber of the cybersecurity event.

10. The computer-implemented method according to claim 1, wherein:

the probability of the new iteration of the first computer-executable event suppression instruction being stale indicates a likelihood that the new iteration of the first computer-executable event suppression instruction is suppressing valid cybersecurity events requiring a security investigation.

11. The computer-implemented method according to claim 1, wherein:

after implementing the new iteration of the first computer-executable event suppression instruction, the new iteration of the first computer-executable event suppression instruction is configured to automatically suppress one or more inbound cybersecurity alerts associated with a subscriber when the one or more inbound cybersecurity alerts satisfy suppression criteria of the new iteration of the first computer-executable event suppression instruction.

12. The computer-implemented method according to claim 1, further comprising:

after implementing the new iteration of the first computer-executable event suppression instruction into the one or more subscriber-specific cybersecurity environments:

identifying a set of event data signals associated with a subscriber, generating a security alert based on the set of event data signals associated with the subscriber, and automatically suppressing the security alert based on satisfying suppression criteria of the new iteration of the first computer-executable event suppression instruction.

13. The computer-implemented method according to claim 12, further comprising:

based on automatically suppressing the security alert that satisfies the suppression criteria of the new iteration of the first computer-executable event suppression instruction, adding a metadata tag to the cybersecurity alert that indicates the cybersecurity alert was closed via suppression.

14. The computer-implemented method according to claim 13, wherein:

the metadata tag further includes a link to the new iteration of the first computer-executable event suppression instruction that caused the suppression.

15. The computer-implemented method according to claim 1, wherein:

the automated event suppression criteria of the cybersecurity event detection and response service are satisfied based on determining that a plurality of historical, non-malicious cybersecurity events are equivalent to the cybersecurity event, and constructing, via the one or more processors, the first computer-executable event suppression instruction includes:

extracting, from the plurality of historical, non-malicious cybersecurity events, a set of event metadata values in common with the cybersecurity event, and automatically constructing the first computer-executable event suppression instruction using the extracted set of event metadata values.

16. The computer-implemented method according to claim 15, wherein:

the set of event metadata values extracted from the plurality of historical, non-malicious cybersecurity events includes an internet protocol address value, a hostname value, and a vendor name value, and the first computer-executable event suppression instruction automatically suppresses a respective inbound security event when the respective inbound security event includes the internet protocol address value, the hostname value, and the vendor name value.

17. The computer-implemented method according to claim 1, wherein:

the first computer-executable event suppression instruction constructed based on the event data or event features of the cybersecurity event includes:

a first suppression parameter that corresponds to a hostname value, a second suppression parameter that corresponds to a source username value, a third suppression parameter that corresponds to an internet protocol address value, a fourth suppression parameter that corresponds to a vendor name value, a fifth suppression parameter that corresponds to a file path value, and a sixth suppression parameter that corresponds to an email address value.

18. The computer-implemented method according to claim 1, wherein:

generating, via the one or more processors, the new iteration of the first computer-executable event suppression instruction by augmenting or reducing the one or more alert suppression parameters of the first computer-executable event suppression instruction includes:

augmenting the one or more alert suppression parameters to include one or more additional alert suppression parameters of the first computer-executable event suppression instruction.

19. The computer-implemented method according to claim 1, wherein:

generating, via the one or more processors, the new iteration of the first computer-executable event suppression instruction by augmenting or reducing the one or more alert suppression parameters of the first computer-executable event suppression instruction includes:

reducing the one or more alert suppression parameters to remove one more additional alert suppression parameters of the first computer-executable event suppression instruction.

20. The computer-implemented method according to claim 1, wherein:

implementing the new iteration of the first computer-executable event suppression instruction into the one or more subscriber-specific cybersecurity environments of the cybersecurity event detection and response service includes:

implementing the new iteration of the first computer-executable event suppression instruction into a plurality of distinct subscriber-specific cybersecurity environments that corresponds to a plurality of distinct subscribers.

21. The computer-implemented method according to claim 1, further comprising:

prior to implementing the new iteration of the first computer-executable event suppression instruction, executing an event suppression review workflow for the new iteration of the first computer-executable event suppression instruction, wherein executing the event suppression review workflow includes:

electronically transmitting, for review, (i) a reason for the first computer-executable event suppression instruction, (ii) a second plurality of distinct cybersecurity threat-informative simulation metrics computed by the second event suppression simulation for the new iteration of the first computer-executable event suppression instruction, and (iii) provisory parameters of the new iteration of the first computer-executable event suppression instruction;

electronically receiving, via the one or more processors, an approval review signal approving the new iteration of the first computer-executable event suppression instruction; and in response to receiving the approval review signal, automatically encoding a security alert engine to include the new iteration of the first computer-executable event suppression instruction.

* * * * *